United States Patent
Sasaki

(10) Patent No.: US 6,646,828 B1
(45) Date of Patent: Nov. 11, 2003

(54) THIN FILM MAGNETIC HEAD AND METHOD OF MANUFACTURE THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 284 days.

(21) Appl. No.: 09/663,413

(22) Filed: Sep. 15, 2000

(30) Foreign Application Priority Data

Sep. 17, 1999 (JP) .......................................... 11-264263

(51) Int. Cl.⁷ ............................................... G11B 5/31
(52) U.S. Cl. ................................................... 360/126
(58) Field of Search ................................. 360/126, 125

(56) References Cited

U.S. PATENT DOCUMENTS

| | | | | |
|---|---|---|---|---|
| 5,075,280 A | * | 12/1991 | Pisharody et al. | 505/171 |
| 6,285,532 B1 | * | 9/2001 | Sasaki | 360/317 |
| 6,330,127 B1 | * | 12/2001 | Sasaki | 360/126 |
| 6,333,841 B1 | * | 12/2001 | Sasaki | 360/317 |

FOREIGN PATENT DOCUMENTS

| | | | |
|---|---|---|---|
| JP | 55-77024 | * | 6/1980 |
| JP | 61-107515 | * | 5/1986 |
| JP | 61-229221 | * | 10/1986 |
| JP | 61-237217 | * | 10/1986 |
| JP | 63-58610 | | 3/1988 |
| JP | 63-64612 | | 3/1988 |
| JP | 01258211 A | | 10/1989 |
| JP | 2-302916 | | 12/1990 |
| JP | 5-46965 | * | 2/1993 |
| JP | 6-314414 | * | 11/1994 |
| JP | 8-147625 | * | 7/1996 |
| JP | 11-213329 | | 8/1999 |
| JP | 11-353614 | | 12/1999 |
| JP | P2000-105907 | | 4/2000 |

* cited by examiner

*Primary Examiner*—William Klimowicz
(74) *Attorney, Agent, or Firm*—Oliff & Berridge, PLC

(57) ABSTRACT

A thin film magnetic head capable of optimally controlling a magnetic flux flowing from a yoke portion in a magnetic layer to a pole portion and a method of manufacturing the same. In a top pole in a recording head of a thin film magnetic head, a nonmagnetic area is formed in a position close to a top pole tip. The nonmagnetic area comprises a through hole and a nonmagnetic body buried in the through hole, and is positioned in the center in the width direction of an overwrite suppressing portion. The nonmagnetic area controls the flow of a magnetic flux flowing via a magnetic flux converging portion to a top pole tip.

12 Claims, 23 Drawing Sheets

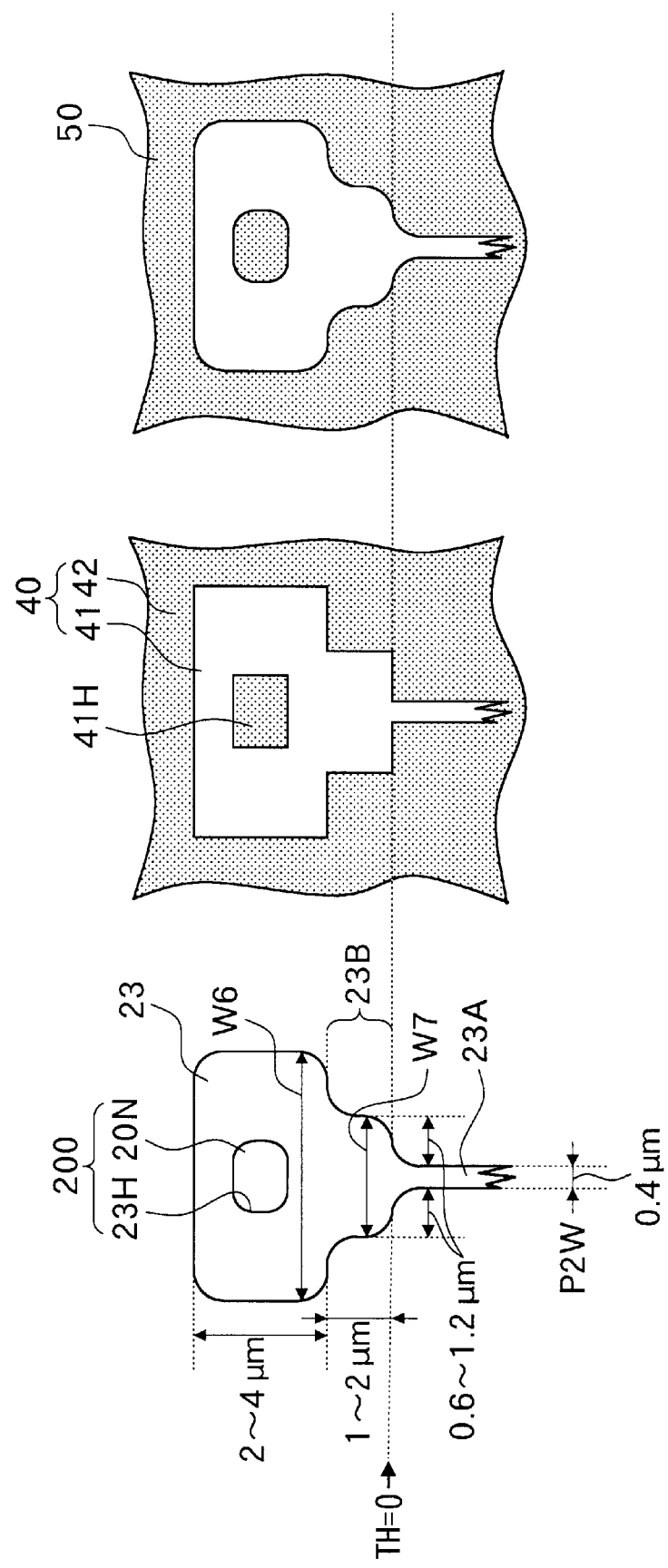

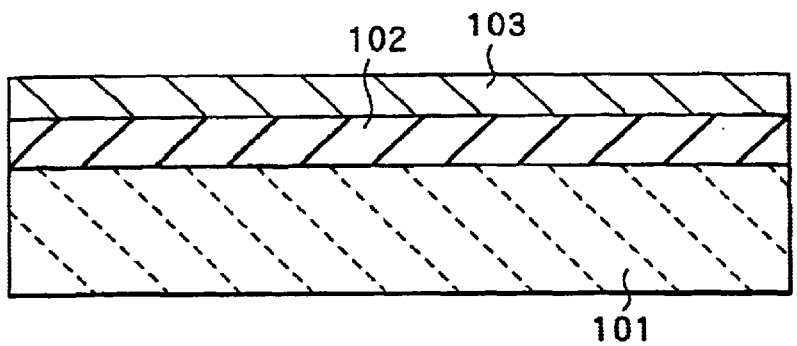
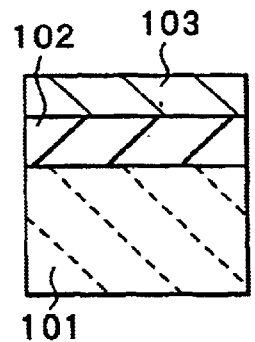
FIG.30A
PRIOR ART
FIG.30B
PRIOR ART
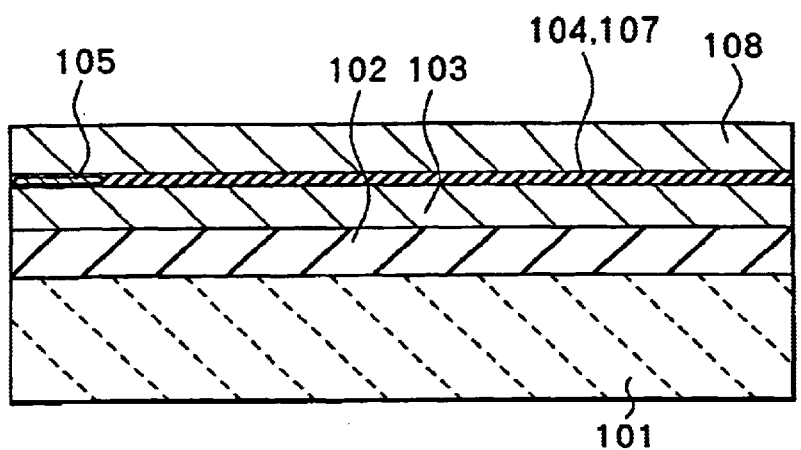
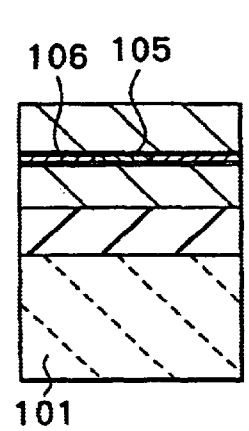
FIG.31A
PRIOR ART
FIG.31B
PRIOR ART
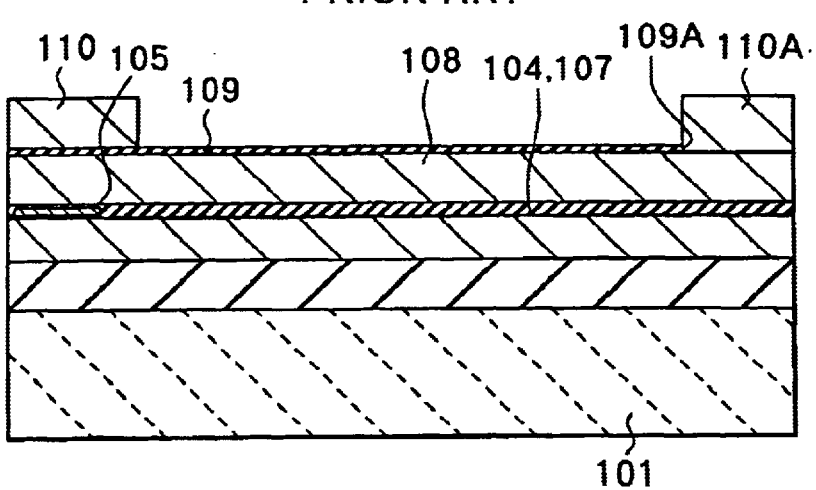
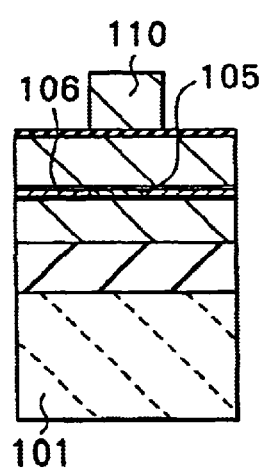
FIG.32A
PRIOR ART
FIG.32B
PRIOR ART

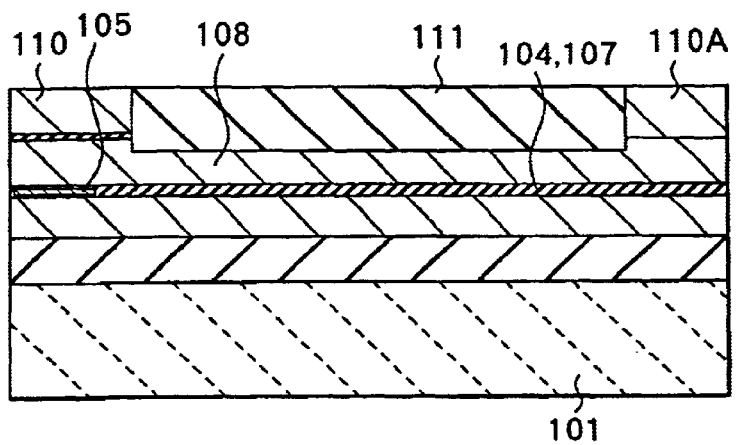
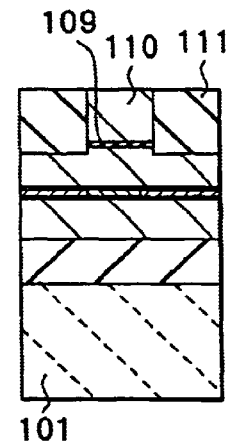
FIG.33A PRIOR ART
FIG.33B PRIOR ART
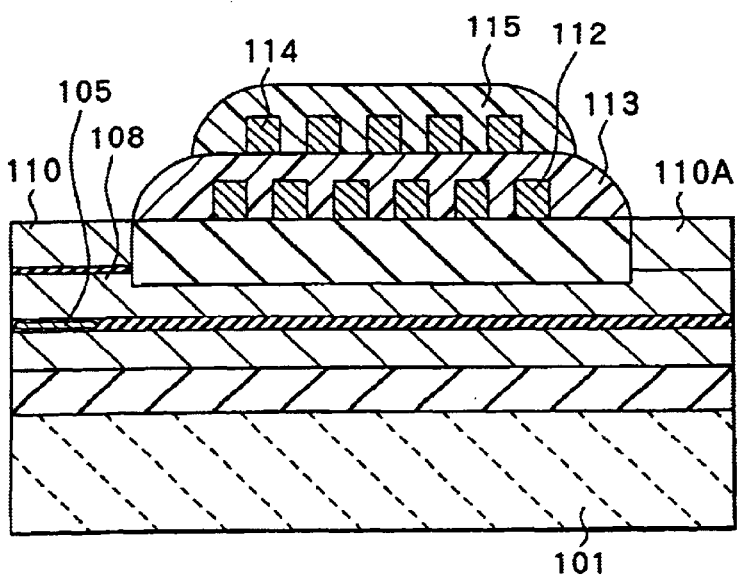
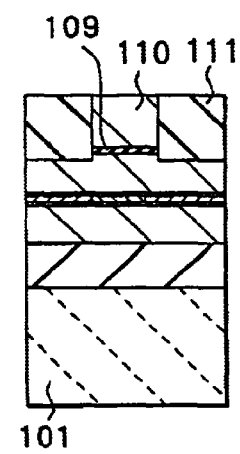
FIG.34A PRIOR ART
FIG.34B PRIOR ART

THIN FILM MAGNETIC HEAD AND METHOD OF MANUFACTURE THE SAME

BACKGROUND OF THE INVENTION

1. Field of the Invention

The present invention relates to a thin film magnetic head having at least an inductive magnetic transducer for writing and a method of manufacturing the same.

2. Description of the Related Art

In recent years, improvement in performance of a thin film magnetic head is demanded in association with improvement in surface recording density of a hard disk drive. As a thin film magnetic head, a composite thin film magnetic head in which a recording head having an inductive magnetic transducer for writing and a reproducing head having a magnetoresistive (hereinbelow, referred to as MR) device for reading are stacked is widely used. MR devices include an anisotropic magnetoresistive (hereinbelow, described as AMR) device using the AMR effect and a GMR (giant magnetoresistive) device using the GMR effect. A reproducing head using the AMR device is called an AMR head or simply an MR head. A reproducing head using the GMR device is called a GMR head. The AMR head is used as a reproducing head having a surface recording density which is higher than 1 Gbit/inch$^2$. The GMR head is used as a reproducing head whose surface recording density is higher than 3 Gbits/inch$^2$.

The AMR film is a film made of a magnetic substance producing the MR effect and has a single layer structure. On the other hand, many of GMR films have a multi-layer structure in which a plurality of films are combined. There are some kinds of mechanisms of producing the GMR effect. The layer structure of the GMR film varies according to the mechanism. As GMR films, a super lattice GMR film, a spin valve film, a granular film, and the like have been proposed. The spin valve film is promising as a GMR film having a relatively simple construction and exhibiting a large resistance change with a weak magnetic field, which is intended for mass production.

A factor of determining the performance of the reproducing head is processing accuracy of a pattern width, especially, an MR height. The MR height is the length (height) from the end on the air bearing surface (ABS) side of the MR device to the end on the opposite side, and is inherently controlled by a polishing amount at the time of processing the air bearing surface. The air bearing surface is a surface of a thin film magnetic head, which faces a magnetic recording medium, and is also called a track surface.

On the other hand, in association with the improvement in performance of a reproducing head, improvement in performance of a recording head is also demanded. In order to increase the recording density in the performance of the recording head, it is necessary to raise the track density in a magnetic recording medium. For this purpose, it is necessary to realize a recording head of a narrow track structure in which the track width on the air bearing surface of each of a bottom pole and a top pole formed while sandwiching a write gap is reduced to the order of a few microns to submicrons. In order to achieve this, semiconductor processing techniques are used.

Another factor of determining the performance of the recording head is processing accuracy of the throat height (TH). The throat height is the length (height) of a portion (magnetic pole portion) extending from the air bearing surface to the edge of an insulating layer which electrically isolates a thin film coil. In order to improve the performance of the recording head, reduction in the throat height is desired. The throat height is also controlled by a polishing amount at the time of processing the air bearing surface.

In order to improve the performance of a thin film magnetic head, it is important to form the recording head and a reproducing head as described above with a good balance.

Referring now to FIGS. 30A and 30B to FIGS. 35A and 35B, a method of manufacturing a composite thin film magnetic head as an example of a conventional thin film magnetic head will be described. FIG. 36 is a plan view of a conventional composite thin film magnetic head. FIGS. 30A to 35A are cross sections each taken along cut line XXXVA—XXXVA of FIG. 36. FIGS. 30B to 35B are process cross sections each taken along cut line XXXVB—XXXVB of FIG. 36.

First, as shown in FIGS. 30A and 30B, an insulating layer 102 made of, for example, alumina (aluminium oxide, $Al_2O_3$) is formed in thickness of about 5 to 10 μm on a substrate 101 made of, for example, altic ($Al_2O_3$.TiC). Subsequently, a bottom shield layer 103 for a reproducing head made of permalloy (NiFe) or the like is formed on the insulating layer 102.

As shown in FIGS. 31A and 31B, for example, alumina is then formed in thickness of 100 nm to 200 nm on the bottom shield layer 103 to form a shield gap film 104. An MR film 105 for constructing an MR device for reproduction is deposited in thickness of tens nm on the shield gap film 104 and is formed in a desired shape by high-precision photo-lithography. Then a pair of lead terminal layers 106 are formed on both ends of the MR film 105 by a lift-off method. A shield gap film 107 is formed on the shield gap film 104, MR film 105, and lead terminal layers 106 and the MR film 105 and the lead terminal layers 106 are buried between the shield gap films 104 and 107. A top shield-cum-bottom pole (hereinbelow, simply described as bottom pole) 108 having a thickness of 3 μm made of a magnetic material such as NiFe used for both the reproducing head and the recording head is formed on the shield gap film 107.

As shown in FIGS. 32A and 32B, on the bottom pole 108, a write gap layer 109 having a thickness of 200 nm as an insulating film which is, for example, an alumina film is formed. Further, the write gap layer 109 is patterned by photolithography and an opening 109A for connecting the bottom pole 108 and a top pole (116) which will be formed later on the write gap layer is formed. Subsequently, a pole tip 110 is formed by using a magnetic material such as NiFe or iron nitride (FeN) by plating and a poles coupling portion 110A for magnetically connecting the top pole and the bottom pole 108 is formed. By preliminarily forming the poles coupling portion 110A, the bottom pole 108 and the top pole can be easily magnetically connected to each other without forming an opening (through hole) for connecting both of the poles after forming an insulating layer 111 and planarizing the surface of the insulating layer 111 by a CMP (Chemical and Mechanical Polishing) process.

As shown in FIGS. 33A and 33B, the pole tip 110 is used as a mask and etching of about: 0.3 to 0.5 μm is performed by ion milling to remove a part of the surfaces of the write gap layer 109 and the bottom pole 108. Etching is performed to the bottom pole 108 and a trim structure is obtained, thereby preventing the effective write track width from being expanded (that is, the expansion of a magnetic flux in the bottom pole 108 is suppress at the time of writing data). Subsequently, the insulating layer 111 made of, for example, alumina having a thickness of about 3 μm is formed on the whole surface of the substrate and the whole surface of the insulating layer 111 is planarized by CMP.

As shown in FIGS. 34A and 34B, a thin film coil 112 as the first layer for an inductive recording head made of, for example, copper (Cu) is selectively formed on the insulating layer 111 by plating or the like. Subsequently, a photoresist film 113 is formed in a predetermined pattern by high-precision photolithography on the insulating layer 111 and the thin film coil 112. Then, heat treatment is performed at a predetermined temperature for planarizing the photoresist film 113 and insulating t urns of the thin film coil 112. Further, under conditions similar to those of the first thin film coil 112, a thin film coil 114 as the second layer is formed on the photoresist film 113. A photoresist film 115 is formed on the second thin film coil 114 and heat treatment is performed at a predetermined temperature for planarizing the photoresist film 115 and insulating the turns of the thin film coil 114 from each other.

As shown in FIGS. 35A and 35B, a top yoke-cum-top pole (hereinbelow, simply described as top pole) 116 made of a magnetic material such as NiFe for the recording head is formed on the pole tip 110 and the photo resist films 113 and 115. As shown in FIG. 36, the top pole 116 is in contact with and magnetically coupled to the bottom pole 108 via the poles coupling portion 110A in the center portion of each of the thin film coils 112 and 114. Subsequently, an overcoat layer 117 made of, for example, alumina is formed on the top pole 116 (refer to FIGS. 35A and 35B). Finally, by machining a slider, the track surface (air bearing surface) 118 of the recording head and reproducing head is formed, thereby completing a thin film magnetic head.

In FIGS. 35A and 35B and FIG. 36, reference characters TH denote the throat height and MR-H indicates the MR height. Reference numeral P2W shows the track (pole) width. A factor of determining the performance of the thin film magnetic head other than the throat height TH, the MR height MR-H, and the like is an apex angle θ shown in FIG. 35A. The apex angle θ is formed between the straight line connecting the corners of side faces on the track face sides of the photoresist films 113 and 115 and the top face of the top pole 116.

It is presumed that the surface recording density of a thin film magnetic head of this kind will reach as high as 10 Gbits/inch$^2$ to 20 Gbits/inch$^2$ in near future and will be used in a high frequency band of 300 MHz to 500 MHz. It is an important issue to optimally assure a magnetic volume around a position where the throat height TH is zero.

As a matter of course, when a large magnetic volume is obtained around the position where the throat height TH is zero, the overwrite characteristic can be improved. Japanese Unexamined Patent Application No. 2000-105907 discloses a top pole having spread of 90 degrees from the track width P2W near the position where the throat height TH is zero and clarifies that the overwrite write characteristic is easy to be improved by such a top pole.

In the case where a magnetic flux is concentrated around the position where the throat height TH is zero, a large amount of the magnetic flux leaks from the pole tip to a magnetic recording medium. Consequently, a problem such as side write that recording data is written on a recording track next to a recording track to which recording data is inherently to be written and spreading of the recording track width on a magnetic recording medium often occurs.

Further, in a thin film magnetic head, when a magnetic flux flows excessively from the pole tip and the flow of the magnetic flux is regulated extremely around the air bearing surface, a trouble such that the magnetic effective write track width in a low frequency characteristic and that in a high frequency characteristic are extremely different from each other often occurs. When an excessive magnetic flux flows to a portion around the air bearing surface, a trouble such that "side track erase" of erasing recording data which has been already written in a recording track next to a recording track to which recording data is to be written often occurs. Particularly, in a thin film magnetic head assembled in a hard disk drive, when a magnetic disk is skewed laterally, the side track erase often occurs in the center or peripheral area of the magnetic disk.

SUMMARY OF THE INVENTION

The invention has been achieved in consideration of the problems and its first object is to provide a thin film magnetic head capable of optimally controlling a magnetic flux flowing in a pole (pole tip) and a magnetic layer (capable of performing an optimal flux control) and a method of manufacturing the same.

A second object of the invention is to provide a thin film magnetic head capable of improving an overwrite characteristic by avoiding saturation of a magnetic flux and assuring supply of a sufficient magnetic flux to a pole and capable of preventing inconveniences such as side write, spreading of the recording track width, and side track erase by suppressing a flow of an excessive magnetic flux to a pole and a method of manufacturing the thin film magnetic head.

A third object of the invention is, while achieving the second object of the invention, to provide a thin film magnetic head capable of reducing an amount of a difference between magnetic effective write track widths due to different frequency characteristics and a method of manufacturing the same.

Further, a fourth object of the invention is to provide a thin film magnetic head capable of achieving at least any one of the first to third objects by a simple structure or a simple manufacturing method and a method of manufacturing the same.

Further, a fifth object of the invention is to provide a thin film magnetic head capable of achieving the first to fourth objects while reducing the number of manufacturing steps and a method of manufacturing the same.

According to the invention, there is provided a thin film magnetic head including: two magnetic layers magnetically coupled to each other and having two magnetic poles which face each other with a gap layer in between in part close to a recording-medium-facing surface facing a recording medium, a thin film coil provided between the two magnetic layers, and an insulating layer for insulating the thin film coil from the two magnetic layers, wherein a nonmagnetic area is formed in at least one of the two magnetic layers.

According to the invention, there is provided a method of manufacturing a thin film magnetic head including: two magnetic layers magnetically coupled to each other and having two magnetic poles which face each other with a gap layer in between in part close to a recording-medium-facing surface facing a recording medium, a thin film coil provided between the two magnetic layers, and an insulating layer for insulating the thin film coil from the two magnetic layers, the method comprising the steps of forming the two magnetic layers; and forming a nonmagnetic area in at least one of the two magnetic layers.

In a thin film magnetic head or a method of manufacturing the same according to the invention, the nonmagnetic area exists in at least one of the two magnetic layers, so that the magnetic flux cannot pass the nonmagnetic area. That is, the nonmagnetic area functions as a kind of an obstacle for the flow of the magnetic flux.

In a thin film magnetic head or a method of manufacturing the same according to the invention, especially, when the "nonmagnetic area" is disposed in a position close to the pole portion, the magnetic flux flowing from the portion except for the pole portion to the pole potion can be effectively controlled. The "nonmagnetic area" can be constructed so as to have a hole formed in the magnetic layers and the nonmagnetic area is formed as a nonmagnetic body buried in the hole. The "hole" includes not only a through hole which completely penetrates the magnetic layer but also a bottomed hole having a part of the magnetic layer on the bottom. The width of the hole is, preferably, wider than the width of the magnetic poles and narrower than the width of the magnetic layer other than the magnetic poles.

The "nonmagnetic area" can be made of a material including at least one of an insulating material or a conductive material. It is preferable to form the "nonmagnetic area" in a central portion in the width direction of the magnetic layer. In this case, the magnetic flux flowing to the pole portion is once received and the force of the flow is lessened. More preferably, the received magnetic flux is shunted so as to detour the nonmagnetic area, merged again, and be led to the pole portion.

In the thin film magnetic head or the method of manufacturing the same according to the invention, preferably, an edge position opposite to the recording-medium-facing surface, of at least one of the two magnetic poles, coincides with an edge position close to the recording-medium-facing surface, of the insulating layer, and the nonmagnetic area is disposed in a neighbor of the edge opposite to the recording-medium-facing surface, of the magnetic poles.

Preferably, in the method of manufacturing the thin film magnetic head according to the invention, the step of forming the nonmagnetic area includes: a step of forming a hole in at least one of the magnetic layers; and a step of burying a nonmagnetic body in the hole. In this case, for example, when the hole is formed upon formation of the magnetic layer and the nonmagnetic area is formed by burying the same insulating material in the hole upon deposition of the insulating material covering the magnetic layer, the nonmagnetic area is formed by using the process of forming the magnetic layer and the process of depositing the insulating material. Thus, a process especially for forming the nonmagnetic area is not needed.

In the thin film magnetic head or the method of manufacturing the same according to the invention, at least one of the magnetic layers includes: one of the two magnetic poles; and a yoke integrated with and magnetically coupled to the one of the two magnetic poles so as to extend to an area in which the thin film coil is formed. In this case, it can be constructed that the one of the poles and the yoke are formed in the single layer and the nonmagnetic area is disposed in a part of the yoke. It is also possible to form the one of the poles and the yoke in different layers and dispose the nonmagnetic area in a part of the yoke portion. It is also possible to form the one of the poles and the yoke separately and dispose the nonmagnetic area in a part of one of the pole portions.

According to the invention, there is provided another thin film magnetic head including: two magnetic layers magnetically coupled to each other and having two magnetic poles which face each other with a gap layer in between in part close to a side of a recording-medium-facing surface; and a thin film coil disposed between the two magnetic layers, and an insulating layer for insulating the thin film coil from the two magnetic layers, wherein in at least one of the two magnetic layers, a magnetic flux control portion for controlling the flow of a magnetic flux in the at least one of the magnetic layers is provided.

According to the invention, there is provided a method of manufacturing another thin film magnetic head having: two magnetic layers magnetically coupled to each other and having two magnetic poles which face each other with a gap layer in between in part close to a recording-medium-facing surface facing a recording medium, a thin film coil provided between the two magnetic layers, and an insulating layer for insulating the thin film coil from the two magnetic layers, comprising the steps of: forming the two magnetic layers; and forming a magnetic flux control portion for controlling the flow of a magnetic flux in at least one of the two magnetic layers.

In the above. cases, it is preferable to dispose the magnetic control portion in a position close to the pole portion.

Other and further objects, features and advantages of the invention will appear more fully from the following description.

BRIEF DESCRIPTION OF THE DRAWINGS

FIG. 26A is a plan view of a top pole tip in a recording head portion in a thin film magnetic head according to a sixth embodiment of the invention, FIG. 26B is a plan view of a manufacturing mask of the top pole tip, and FIG. 26C is a plan view of a photoresist film for forming the top pole tip.

FIGS. 30A and 30B are process cross sections for explaining a method of manufacturing a conventional thin film magnetic head.

FIGS. 31A and 31B are process cross sections following FIGS. 30A and 30B, respectively.

FIGS. 32A and 32B are process cross sections following FIGS. 31A and 31B, respectively.

FIGS. 33A and 33B are process cross sections following FIGS. 32A and 32B, respectively.

FIGS. 34A and 34B are process cross sections following FIGS. 33A and 33B, respectively.

DETAILED DESCRIPTION OF THE PREFERRED EMBODIMENTS

Figures 1A, 1B:
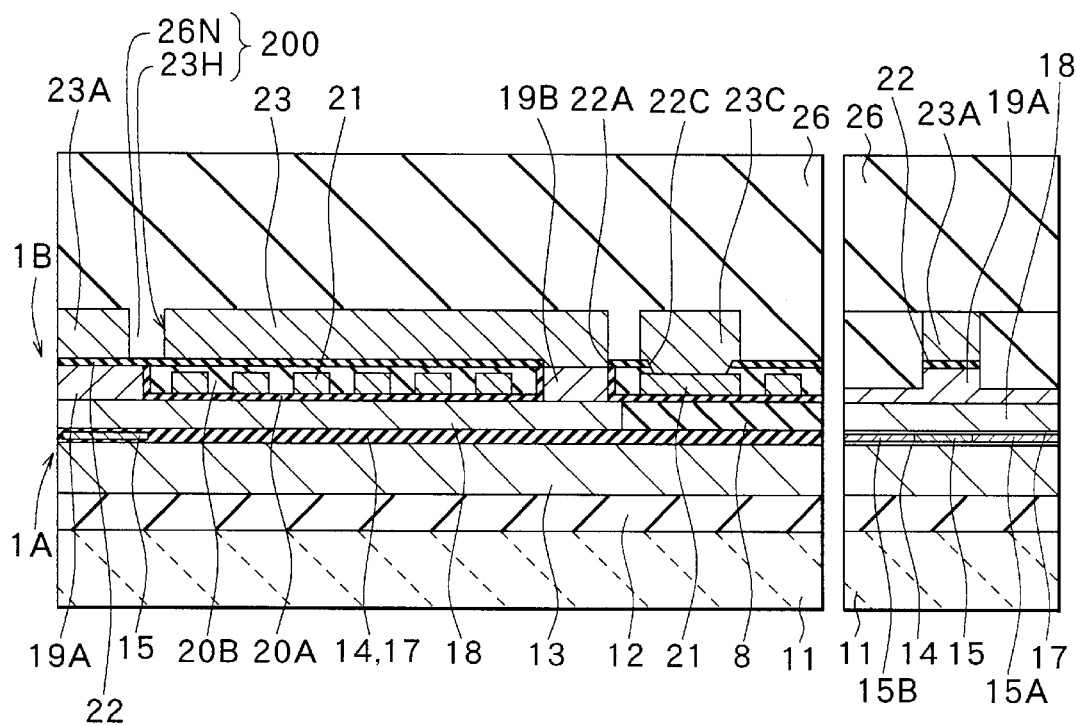
FIG. 1A is a cross section of a main portion of a thin film magnetic head according to a first embodiment of the invention (cross section taken along line IA—IA of FIG. 2)
FIG. 1B is a cross section of the main portion of the thin film magnetic head according to the first embodiment of the invention (cross section taken along line IB—IB of FIG. 2).

Embodiments of the invention will be described in detail hereinbelow by referring to the drawings.

First Embodiment

Figure 2:
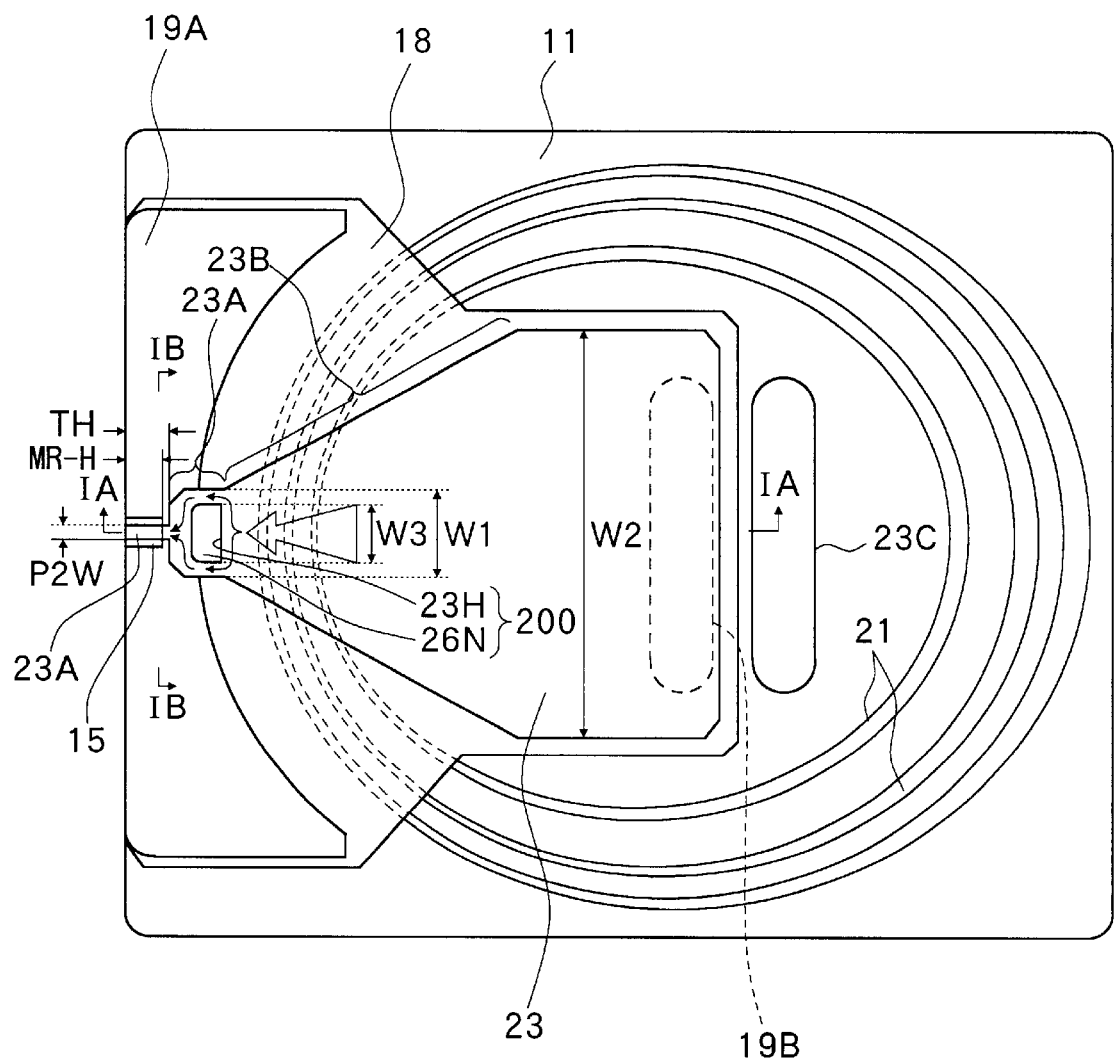
FIG. 2 is a plan view of a recording head portion in the thin film magnetic head according to the first embodiment of the invention.

As a first embodiment of the invention, an example of applying the invention to a composite thin film magnetic head having both a reproducing head and a recording head including a thin film coil for generating a magnetic flux (hereinbelow, simply called a thin film magnetic head). FIG. 1A is a cross section of a main portion of a thin film magnetic head according to a first embodiment of the invention (cross section taken along line IA—IA of FIG. 2), and FIG. 1B is a cross section of the main portion of the thin film magnetic head according to the first embodiment of the invention (cross section taken along line IB—IB of FIG. 2). FIG. 2 is a plan view, of a recording head portion in the thin film magnetic head according to the first embodiment of the invention.

As shown in FIGS. 1A and 1B and FIG. 2, a thin film magnetic head according to the first embodiment comprises a magnetoresistive reading head portion for reproduction (hereinbelow, simply called a reproducing head portion) 1A and an inductive recording head portion for recording (hereinbelow, simply, called a recording head portion) 1B. The recording head portion 1B is disposed on the reproducing head portion 1A.

As shown in FIGS. 1A and 1B, the reproducing head portion 1A has, on a substrate 11 made of, for example, altic ($Al_2O_3 \cdot TiC$), an insulating layer 12 made of, for example, alumina (aluminum oxide $Al_2O_3$), a bottom shield layer 13 made of, for example, iron aluminum silicon (FeAlSi), a shield gap layer 14 made of, for example, alumina, and a magnetoresistive film (hereinbelow, simply called an MR film) 15 in a predetermined pattern.

Further, in the reproducing head portion 1A, a pair of lead terminal layers 15A and 15B made of a material which is not diffused to the MR film, such as tantalum (Ta) or tungsten (W) are formed on the shield gap layer 14. The lead terminal layer 15A is electrically connected to one end of the MR film 15, and the lead terminal layer 15B is electrically connected to the other end of the MR film 15. The MR film 15 is made of various materials having the magnetoresistive effect such as Permalloy (NiFe alloy), nickel (Ni)-cobalt (Co) alloy, and the like. On the MR film 15 and the lead terminal layers 15A and 15B, a shield gap layer 17 made of alumina or the like is deposited. That is, the MR film 15 and the lead terminal layers 15A and 15B are buried between the shield gap layers 14 and 17. The MR film 15 is not especially limited to the above but a magnetoresistive film producing a magnetoresistive effect such as an AMR film, a GMR film in which a nonmagnetic layer is interposed between a free magnetizing direction layer (magnetic layer) and a fixed magnetizing direction layer (magnetic layer), or a TMR film may be also used.

The recording head portion 1B is stacked on the reproducing head portion 1B. The recording head portion 1B has: a bottom magnetic layer including a bottom pole 18 and a bottom pole tip 19A which are magnetically coupled to each other; a top magnetic layer including a top pole (or yoke pole) 23 and a top pole tip 23A which are magnetically coupled to each other; and a thin film coil 21 for generating a magnetic flux. The bottom pole tip 19A and the top pole tip 23A face each other via a write gap layer 22. A nonmagnetic area 200 for controlling the flow of a magnetic flux is formed in a part of the top pole tip 23A. The bottom and top magnetic layers correspond to an example of "at least two magnetic layers" in the invention. The top pole 23 corresponds to an example of "yoke" in the invention.

The bottom pole tip 19A and the top pole tip 23A correspond to an example of "two pole portions" in the invention. Further, the nonmagnetic area 200 corresponds to an example of "nonmagnetic area" according to the invention.

The bottom pole 18 also serves as a top shield layer of the MR film 15. In the embodiment, the bottom pole tip 19A is formed on the bottom pole 18, as a layer separate from the bottom pole 18, and is magnetically coupled to the bottom pole 18. The top pole tip 23A and the top pole 23 are integrally formed as the same magnetic layer. The bottom pole 18 and the top pole 23 are magnetically coupled to each other via a magnetic connection portion 19B. The magnetic connection portion 19B is formed by the same magnetic layer as the bottom pole tip 19A. The area on the rear side (in the direction apart from the air bearing surface) of the bottom pole 18 is filled with an insulating layer 8 to the same level as the bottom pole 18.

It is practical to form each of the bottom pole 18, bottom pole tip 19A, magnetic connection portion 19B, top pole tip 23A and top pole 23 by using, for example, a material having high saturated magnetic flux density (Hi-Bs material), specifically, NiFe (Ni: 50% by weight, Fe: 50% by weight), NiFe (Ni: 80% by weight, Fe: 20% by weight), FeN, FeZrNP, CoFeN or the like.

The recording head portion 1B has a trim structure such that a part of the surface of each of the top pole tip 23A, write gap layer 22, and bottom pole tip 19A is cut in accordance with a predetermined track width, thereby suppressing the spread of the effective write track width, that is, the spread of the magnetic flux in the bottom pole tip 19A at the time of writing of magnetic data.

The thin film coil 21 is disposed on the bottom pole 18, between the bottom pole tip 19A and the magnetic connection portion 19B and also on the right side of the magnetic connection portion 19B in FIG. 1A and in FIG. 2. That is, the thin film coil 21 is disposed so as to spirally surround the magnetic connection portion 19B which is almost to be a center a plurality of times. The thin film coil 21 is formed on an insulating layer 20A on the bottom pole 18 and is buried by an insulating layer 20B whose surface is planarized so as to be flush with the top faces of the bottom pole tip 19A and the magnetic connection portion 19B. By burying the thin film coil 21 in a recess formed between the bottom pole tip 19A and the magnetic connection portion 19B as described above, a step in the apex portion can be reduced. The thin film coil 21 is electrically connected to the coil connection wire 23C via a connection hole 22A. The coil connection wire 23C is formed in the same layer as the top pole 23.

The write gap layer 22 is formed on the bottom pole tip 19A and the planarized insulating layer 20B. An area sandwiched by the bottom pole tip 19A of the write gap layer 22 and the top pole tip 23A is used as an inherent write gap layer. The write gap layer 22 formed in the other area is used as a magnetic isolation layer between the bottom pole 18 and the top pole 23. The bottom pole tip 19A and the top pole tip 23A are magnetically coupled to each other via the magnetic connection portion 19B in the opening 22A formed in the write gap layer 22 on the magnetic connection portion 19B.

The nonmagnetic area 200 has a through hole 23H formed in the top pole 23 near the top pole tip 23A and a nonmagnetic body 26N buried in the through hole 23H. The through hole 23H corresponds to an example of a through hole in the invention. Similarly, the nonmagnetic body 26N corresponds to an example of the nonmagnetic body in the invention. "The through hole 23H formed near the top pole tip 23A" denotes that the through hole 23H is formed so that the front edge of the through hole 23H is in a range of, for example, 0.5 $\mu$m to 2 $\mu$m from the rear edge of the top pole tip 23A. The invention may include other ranges other than the above.

In FIG. 2, the top pole 23 includes an overwrite improvement portion 23A and a magnetic flux converging portion 23B in the order from one end on the left side (a side close to the magnetic recording medium) toward the other end on the right side (a side close to magnetic connecting portion 19B). The overwrite improvement portion 23A has a width W1 wider than the track width P2W of the top pole tip 23A and narrower than the maximum width W2 of the top pole 23, so that a sufficient magnetic volume can be assured in a portion from the top pole 23 to the top pole tip 23A. The length (height) from the track surface of the top pole tip 23A is equal to the throat height TH and the coupling portion of the top pole tip 23A and the top pole 23 is in the position where the throat height TH is zero. The magnetic flux converting portion 23B has a shape in plan view in which the width is gradually reduced from the maximum width W2 of the top pole 23 to the width W1 of the overwrite improvement portion 23A. The magnetic flux is converged and passed from the top pole 23 to the top pole tip 23A via the overwrite improvement portion 23A.

The through hole 23H in the nonmagnetic area 200 is formed almost in the center portion in the width direction of the overwrite improvement portion 23A in the top pole 23 constructed as described above. The width W3 of the through hole 23H is set to be wider than the track width P2W in the same direction and narrower than the width W1 of the overwrite improvement portion 23A. That is, the nonmagnetic area 200 is not intended to directly pass the magnetic flux converged by the magnetic flux converging portion 23B to the top pole tip 23A but to pass the magnetic flux to the top pole tip 23A by shunting the magnetic flux so as to detour the nonmagnetic area 200 and again merging it.

In the embodiment, the through hole 23H can be formed simultaneously with the formation of the pattern of the top pole 23 (and the top pole tip 23A). An insulating material is used for the nonmagnetic body 26N buried in the through hole 23H. The nonmagnetic body 26N is formed by using a part of the overcoat layer 26 for covering the top pole 23 and protecting the thin film magnetic head.

The thin film magnetic head according to the invention can read information from a magnetic recording medium by the reproducing head portion 1A by using the magnetoresistive effect of the MR film 15 and write information onto the magnetic recording medium by changing a signal magnetic field generated between the top pole tip 23A and the bottom pole tip 19A by a current passed to the thin film coil 21 in the recording head portion 1B.

A method of manufacturing the thin film magnetic head according to the embodiment will now be described. FIGS. 3A and 3B to FIGS. 7A and 7B are process cross sections of a thin film magnetic head for explaining the manufacturing method. FIGS. 3A to 7A are process cross sections each taken along line IA—IA of FIG. 2. FIGS. 3B to 7B are process cross sections each taken along line IB—IB of FIG. 2.

Figures 3A, 3B:
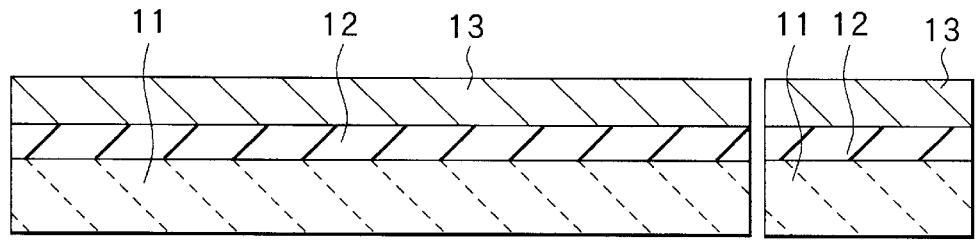
FIGS. 3A and 3B are process cross sections of the thin film magnetic head for explaining a manufacturing method according to the first embodiment of the invention.

First, the substrate 11 made of altic or the like is prepared (refer to FIGS. 3A and 3B) and the insulating layer 12 made of alumina is formed in thickness of about 3 $\mu$m to 5 $\mu$m on the substrate 11 by, for example, sputtering. A photoresist mask is formed on the insulating layer 12. By using the photoresist mask, NiFe is selectively formed in thickness of about 3 $\mu$m by plating. After that, the photoresist mask is removed, thereby forming the bottom shield layer 13 for the reproducing head by using NiFe as shown in FIGS. 3A and 3B. Although not shown in FIGS. 3A and 3B, subsequently, an alumina film having a thickness of about 4 to 6 $\mu$m is formed by, for example, sputtering or CVD (Chemical Vapor Deposition). The surface of the alumina film is planarized by CMP so as to be flush with the surface of the bottom shield layer 13. As a result, a state such that the alumina film is buried around the bottom shield layer 13 is obtained.

Figures 4A, 4B:
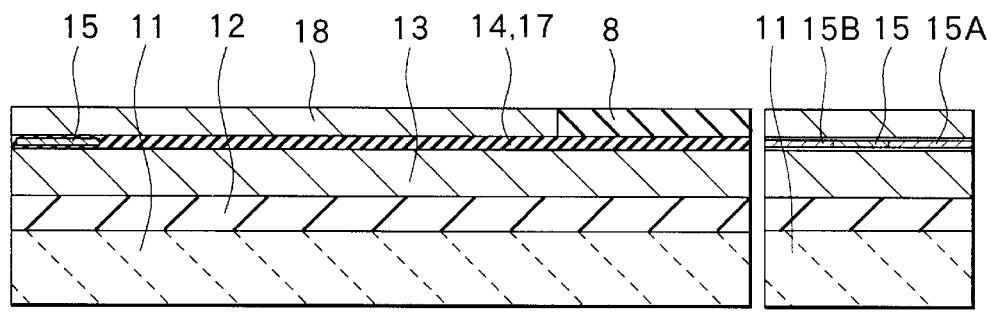
FIGS. 4A and 4B are process cross sections of the thin film magnetic head following FIGS. 3A and 3B, respectively.

For example, an alumina film is deposited in thickness of 100 nm to 200 nm on the bottom shield layer 13 by sputtering, thereby forming the shield gap layer 14 (refer to FIGS. 4A and 4B). Subsequently, the MR film 15 constructing an MR device for reproduction is formed in thickness of tens nm on the shield gap layer 14 and is patterned in a desired shape by high-precision photolithography. The lead terminal layers 15A and 15B are formed on both sides of the MR film 15 by, for example, the lift-off method. Then the shield gap layer 17 is formed on the entire substrate including the shield gap layer 14, MR film 15 and lead terminal layers 15A and 15B to thereby bury the MR film 15 and the lead terminal layers 15A and 15B between the shield gap layers 14 and 17. As shown in FIGS. 4A and 4B, the bottom pole 18 made of NiFe or the like is selectively formed in thickness of about 1.0 $\mu$m to 1.5 $\mu$m on the shield gap layer 17. In the rear area of the bottom pole 18, the insulating layer 8 is buried so as to have the same thickness as that of the bottom pole 18. The bottom pole 18 also serves as the top shield layer of the reproducing head portion 1A. By forming the bottom pole 18, the reproducing head portion 1A is substantially completed.

Figures 5A, 5B:
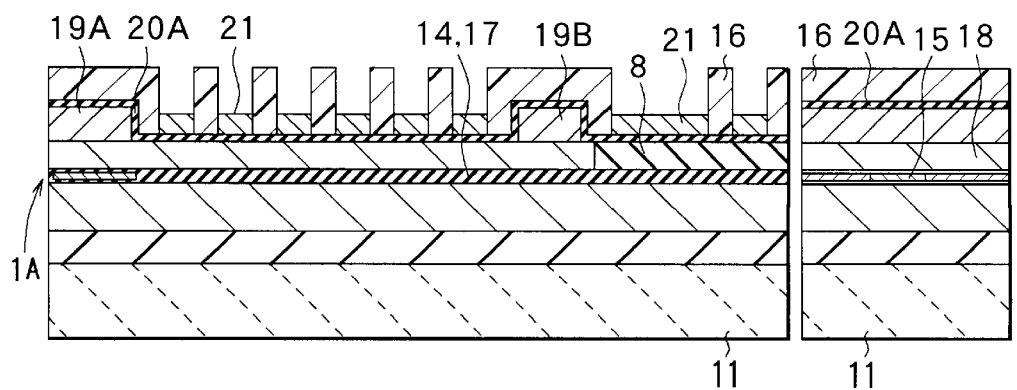
FIGS. 5A and 5B are process cross sections of the thin film magnetic head following FIGS. 4A and 4B, respectively.

The bottom pole tip 19A and the magnetic connection portion 19B are formed in thickness of about 2.0 $\mu$m to 2.5 $\mu$m on the bottom pole 18 (refer to FIG. 5A). The bottom pole tip 19A and the magnetic connection portion 19B may be formed by a plating film of NiFe or the like as described above or may be formed by depositing FeN, FeZrNP, CoFeN or the like by sputtering and patterning the resultant film in a predetermined pattern by ion milling or the like.

Subsequently, the insulating layer 20A having a thickness of 0.3 $\mu$m to 0.6 $\mu$m made of an insulating material such as alumina is formed on the entire surface by sputtering or CVD. Then a photoresist mask 16 is formed. As shown in FIGS. 5A and 5B, by using the photoresist mask 16, the thin film coil 21 for generating a magnetic flux made of copper (Cu) or the like is formed by, for example, electrolytic plating on the insulating layer 20A between the bottom pole tip 19A and the magnetic connection portion 19B and on the insulating layer 20A around the magnetic connection portion 19B on the right side in FIG. 2. The thin film coil 21 is formed in thickness of, for example, 1.0 $\mu$m to 2.0 $\mu$m at the coil pitch of 1.2 $\mu$m to 2.0 $\mu$m.

Figures 6A, 6B:
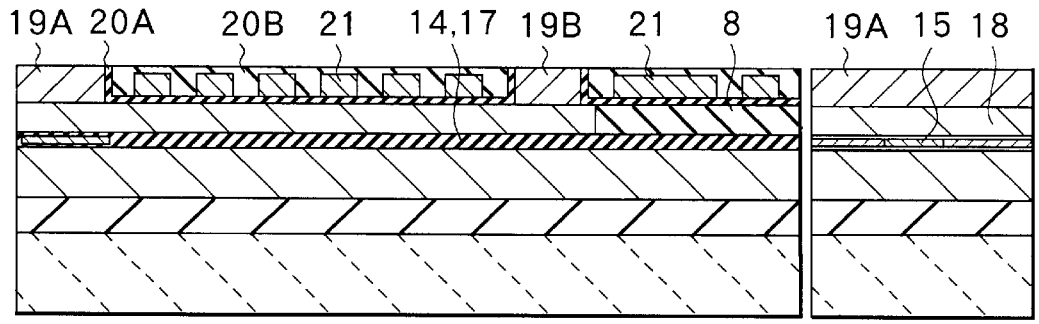
FIGS. 6A and 6B are process cross sections of the thin film magnetic head following FIGS. 5A and 5B, respectively.

After removing the photoresist mask 16, the insulating layer 20B having a thickness of 3.0 $\mu$m to 4.0 $\mu$m made of an insulating material such as alumina is formed by sputtering on the entire substrate also on the thin film coil 21. Subsequently, as shown in FIGS. 6A and 6B, the surface of the insulating layer 20B is planarized by, for example, CMP to a degree that the surface of each of the bottom pole tip 19A and the magnetic connection portion 19B is exposed. Although the surface of the thin film coil 21 is not exposed in the embodiment, it may be properly exposed as necessary.

Figures 7A, 7B:
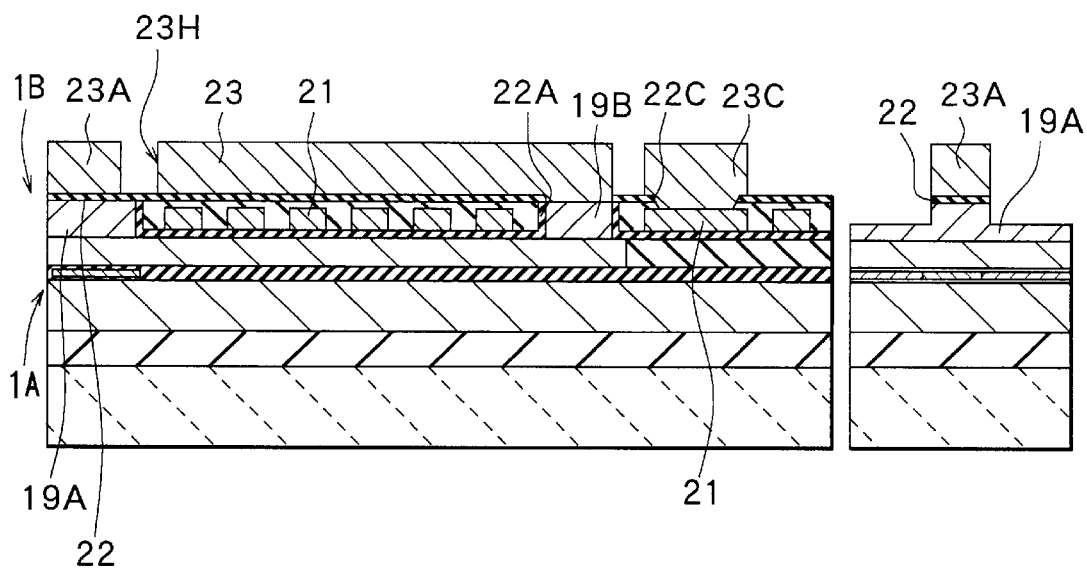
FIGS. 7A and 7B are process cross sections of the thin film magnetic head following FIGS. 6A and 6B, respectively.

On the entire surface of the substrate including the surface of the bottom pole tip 19A, the write gap layer 22 having a thickness of 0.2 $\mu$m to 0.3 $\mu$m made of an insulating material such as alumina is formed (refer to FIGS. 7A and 7B). For the write gap layer 22, not only alumina but also any of nonmagnetic materials of aluminum nitride (AlN), silicon oxide ($SiO_2$), and silicon nitride ($Si_3N_4$) may be practically used. Subsequently, the write gap layer 22 is patterned on the magnetic connection portion 19B and the predetermined thin film coil 21, and the opening 22A for magnetically connecting the magnetic connection portion 19B and the top pole 23 and the connection hole 22C for electrically connecting the thin film coil 21 and the coil connection wire 23C are formed.

Subsequently, as shown in FIGS. 7A and 7B, the top pole tip 23A is formed on the write gap layer 22 on the bottom pole tip 19A, and the top pole 23 and the coil connection wire 23C are also formed. Specifically, a pole layer having a thickness of 2.0 $\mu$m to 3.0 $\mu$m made of a material having high saturated magnetic flux density is formed by, for example, sputtering and is patterned by argon (Ar) ion milling by using the photoresist mask, thereby enabling the top pole tip 23A, top pole 23 and coil connection wire 23C to be formed. Further, in the same process of forming the top pole tip 23A, top pole 23 and coil connection wire 23C, the through hole 23H in the nonmagnetic area 200 is formed in the top pole 23 near the top pole tip 23A (near the position where the throat height TH is zero). That is, the through hole 23H can be formed simultaneously with the patterning of the top pole tip 23A and the like. The top pole 23 is magnetically coupled to the bottom pole 18 with the magnetic connection portion 19B interposed through the opening 22A. The coil connection wire 23C is electrically connected to the thin film coil 21 through the connection hole 22C. In place of the photoresist mask, an etching mask formed by an inorganic insulating film made of alumina or the like may be used. The pole layer may be formed by plating.

Subsequently, by using the top pole tip 23A as an etching mask, a part of the surface of each of the write gap layer 22 and the bottom pole tip 19A which are around the top pole tip 23A is etched in a self aligned manner. The write gap layer 22 is patterned by RIE (Reactive Ion Etching) using chlorine gas ($Cl_2$, $CF_4$, $BCl_2$, $SF_6$ or the like). The bottom pole tip 19A is patterned by, for example, argon ion milling and a part of about 0.3 μm to 0.6 μm in the surface of the bottom pole tip 19A is removed by etching. After completion of the process, the recording head portion 1B of the trim structure is completed.

Finally, as shown in FIGS. 1A and 1B and FIG. 2, the overcoat layer 26 having a thickness of about 30 μm made of alumina is formed on the entire surface by, for example, sputtering. By the formation of the overcoat layer 26, a part of the overcoat layer 26 is buried as the nonmagnetic body 26N in the through hole 23H, so that the nonmagnetic area 200 having the through hole 23H and the nonmagnetic body 26N is formed. After that, a slider is machined to form the track surface (air bearing surface) of each of the recording head portion 1A and the reproducing head portion 1B, thereby completing the thin film magnetic head according to the embodiment.

In the foregoing embodiment, the nonmagnetic area 200 is formed near the top pole tip 23A, that is, in the top pole 23 near the position where the throat height TH is zero. Consequently, the magnetic flux flowing through the top pole tip 23A and the top pole 23 can be optimally controlled.

Further, in the embodiment, the nonmagnetic area 200 is provided in the center in the width direction where the largest amount of magnetic flux flows in the top pole 23. Consequently, the magnetic flux flowing from the top pole 23 to the top pole tip 23A as shown by arrows in FIG. 2 can be once received and shunted so as to detour the nonmagnetic area 200. A rush of the magnetic flux to the top pole tip 23A can be therefore prevented. By properly setting the size of the nonmagnetic area 200 so as not to saturate the magnetic flux flowing to the top pole tip 23A and the top pole 23 at half way, the overwrite characteristic can be improved, the flow of an excessive magnetic flux from the top pole tip 23A can be suppressed, the side write, spreading of the recording track width, side track erase, and the like can be prevented.

Further, in the embodiment, especially, the magnetic flux flowing to the top pole tip 23A can be optimally controlled. Thus, the amount of variation in the magnetic effective write track width due to different frequency characteristics can be also reduced.

Further, since the nonmagnetic area 200 has the through hole 23H and the nonmagnetic body 26N buried in the through hole 23H in the embodiment, the flow of the magnetic flux flowing through the top pole tip 23A and the top pole 23 can be optimally controlled with a simple construction.

Since the nonmagnetic area 200 is formed by creating the through hole 23H upon formation of the top pole tip 23A and the top pole 23 and burying the nonmagnetic body 26N of the same material in the through hole 23H upon formation of the overcoat layer 26 covering the top pole tip 23A and the top pole 23, the nonmagnetic area 200 can be formed by using the process of forming the top pole tip 23A and the top pole 23 and the process of forming the overcoat layer 26. Thus, it is unnecessary to newly add a process of forming the nonmagnetic area 200 to the method of manufacturing the thin film magnetic head, so that the manufacturing process can be prevented from being complicated.

In the embodiment, the nonmagnetic area 200 may be also constructed by a bottomed hole (not-through hole) in place of the through hole 23H and the nonmagnetic body 26N buried in the bottomed hole. Further, the nonmagnetic body 26N is not always limited to an insulating material but a conductor (such as copper) which does not pass the magnetic flux may be also used.

Second Embodiment

Figure 8:
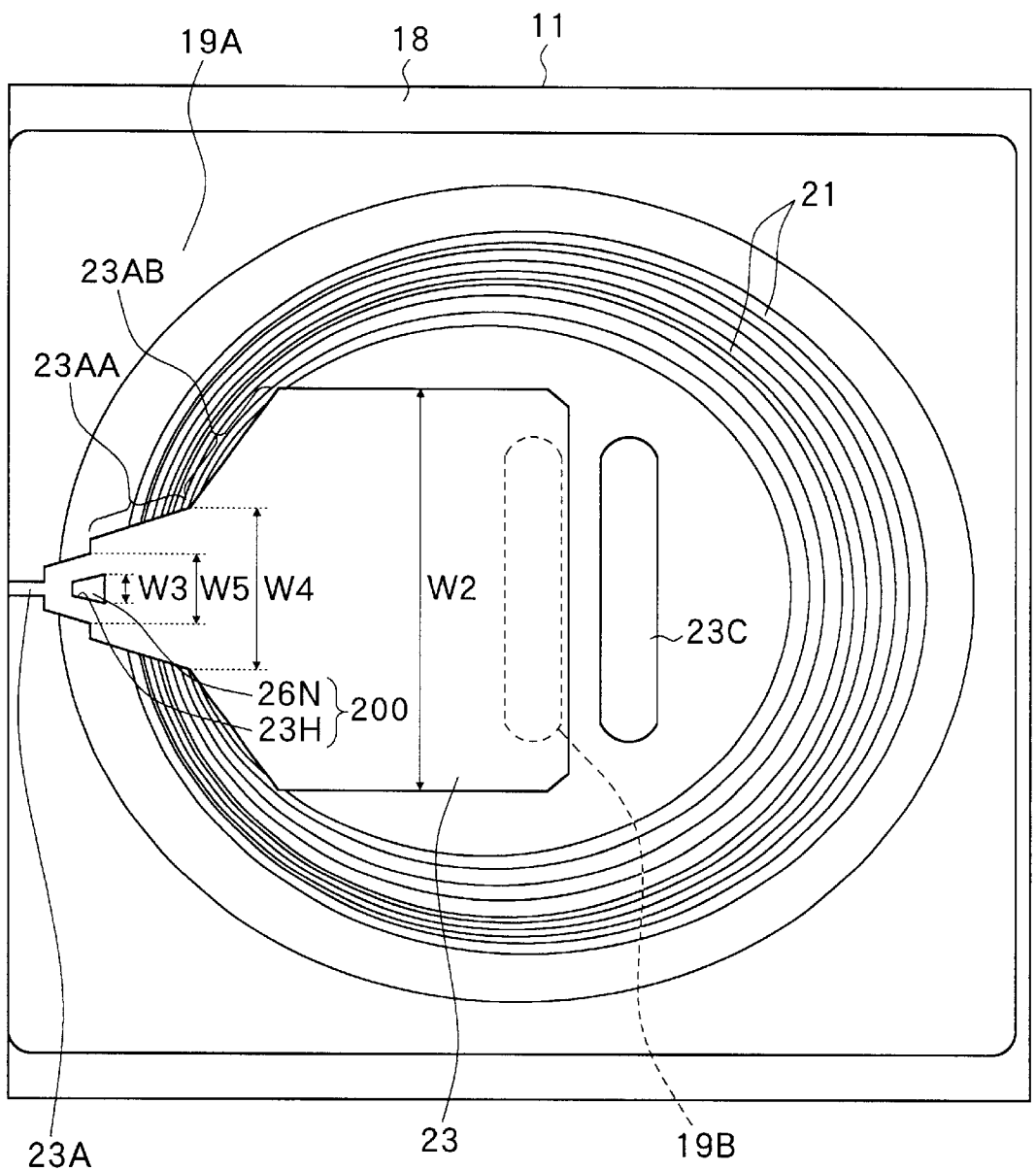
FIG. 8 is a plan view of a recording head portion in a thin film magnetic head according to a second embodiment of the invention.

A second embodiment relates to a thin film magnetic head obtained by modifying the shape in plan view of the bottom pole tip 19A in the recording head portion 1B, top pole 23 and nonmagnetic area 200 in the thin film magnetic head according to the first embodiment. FIG. 8 is a plan view of a recording head portion in the thin film magnetic head according to the second embodiment.

In the embodiment, the bottom pole tip 19A in the recording head portion 1B is provided in the whole peripheral area of the thin film coil 21. In a thin film magnetic head constructed in such a manner and a method of manufacturing the same, the insulating layer 20B is formed after forming the thin film coil 21 and the surface of the insulating layer 20B is planarized by CMP. Since the bottom pole tip 19A is formed with a relatively wide area, the wide range in the surface of the insulating layer 20B can be uniformly planarized.

Further, in the embodiment, the overwrite improvement portions 23AB and 23AA are formed on the top pole 23 in such a manner that the width is gradually narrowed toward the top pole tip 23A. The width W4 of the overwrite improvement portion 23AB is set to be narrower than the width W2 of the top pole 23, and the width W5 of the overwrite improvement portion 23AA is set to be narrower than the width W4 of the overwrite improvement portion 23AB. The widths W4 and W5 are gradually narrowed toward the top pole tip 23A. That is, each of the overwrite improvement portions 23AA and 23AB is formed in a tapered shape in plan view.

In the embodiment, the nonmagnetic area 200 is formed in the top pole 23 near the top pole tip 23A, specifically, over the overwrite improvement portions 23AA and 23AB. The plane shape of the nonmagnetic area 200, that is, the shape of the through hole 23H is similar to that of the overwrite improvement portion 23AA or 23AB and is like a trapezoid of which dimension of the opening becomes gradually smaller toward the top pole tip 23A.

In the embodiment, in a manner similar to the first embodiment, the nonmagnetic area 200 is provided in the top pole 23 near the top pole tip 23A. Consequently, the magnetic flux flowing to the top pole tip 23A and the top pole 23 can be optimally controlled. Further, in the embodiment, since the overwrite improvement portions 23AB and 23AA by which the width is narrowed at two stages are formed in the top pole 23, the magnetic flux flowing from the top pole 23 to the top pole tip 23A can be efficiently (smoothly) converged.

Third Embodiment

Figures 9A, 9B:
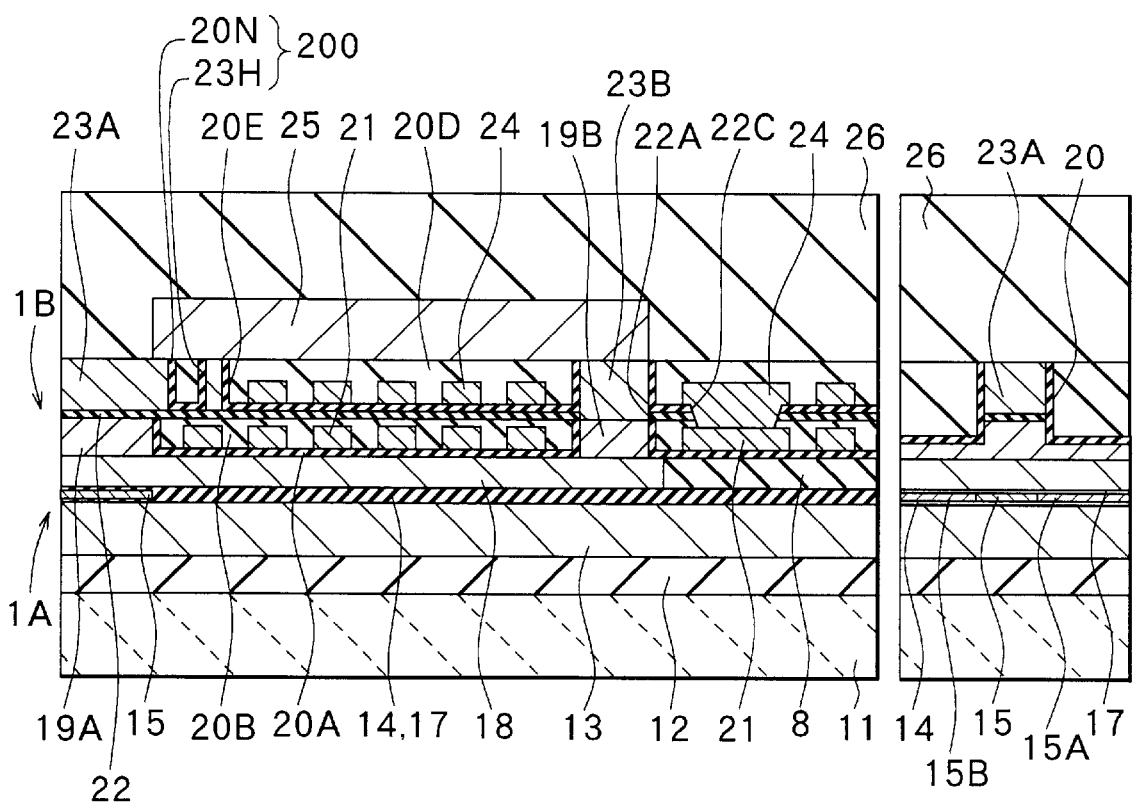
FIG. 9A is a cross section of a main portion of a thin film magnetic head according to a third embodiment of the invention, which is taken along a line perpendicular to the track surface.
FIG. 9B is a cross section of the main portion of the thin film magnetic head, which is taken along a line parallel to the track surface.

A third embodiment of the invention has a construction which is similar to that of the first embodiment except that the top pole tip and the top pole are formed by using different magnetic layers and two thin film magnetic coils for generating a magnetic flux are provided. FIGS. 9A and 9B are cross sections of a main portion of a thin film magnetic head according to the third embodiment, which are taken along a line perpendicular to the track surface and a line parallel to the track surface, respectively.

In the embodiment, the recording head portion 1B has: a bottom magnetic layer including the bottom pole 18 and the bottom pole tip 19A which are magnetically coupled to each other; a top magnetic layer including the top pole 25 and the top pole tip 23A which are magnetically coupled to each other; and two thin film coils 21 and 24 for generating a magnetic flux. The bottom pole tip 19A and the top pole tip 23A face each other via the write gap layer 22. The nonmagnetic area 200 for controlling the flow of a magnetic flux is formed in a part of the top pole tip 23A.

The bottom pole tip 19A is formed on the bottom pole 18, as a layer separate from the bottom pole 18. The top pole 25 and the top pole tip 23A are formed separate from each other so that a part of the top pole 25 overlaps with a part of the top pole tip 23A. The bottom pole 18 and the top pole 25 are magnetically coupled to each other via the magnetic connection portions 19B and 23B.

The first thin film coil 21 is disposed on the bottom pole 18, between the bottom pole tip 19A and the magnetic connection portion 19B and also on-the right side area of the magnetic connection portion 19B in FIG. 9A. That is, the thin film coil 21 is disposed so as to spirally surround the magnetic connection portion 19B which is almost to be a center a plurality of times. The thin film coil 21 is formed on the insulating layer 20A on the bottom pole 18 and is buried in the insulating layer 20B whose surface is planarized so as to be flush with the top faces of the bottom pole tip 19A and the magnetic connection portion 19B.

The second thin film coil 24 is disposed on the first thin film coil 21, between the top pole tip 23A and the magnetic connection portion 23B and also on the right side of the magnetic connection portion 23B in FIG. 9A. That is, the thin film coil 24 is disposed so as to spirally surround the magnetic connection portion 23B which is almost to be a center a plurality of times. The thin film coil 24 is formed on an insulating layer 20E on the write gap layer 22 and is buried in an insulating layer 20D whose surface is planarized so as to be flush with the top faces of the top pole tip 23A and the magnetic connection portion 23B.

The first and second thin film coils 21 and 24 are electrically connected to each other via the connection hole 22A formed in the write gap layer 22 and the insulating layer 20D.

In the embodiment, the nonmagnetic area 200 has the through hole 23H formed in the top pole tip 23A in the position where the throat height TH is zero and the nonmagnetic body 20N either formed along the inner wall of the through hole 23H or completely buried in the through hole 23H.

In the embodiment, the through hole 23H can be formed simultaneously with the formation of the pattern of the top pole tip 23A. An insulating material is used as the nonmagnetic body 20N buried in the through hole 23H. The nonmagnetic body 20N is formed by using a part of each of the insulating layers 20D and 20E on the write gap layer 22.

A method of manufacturing the thin film magnetic head according to the embodiment will now be described. FIGS. 10A and 10B to FIGS. 14A and 14B are process cross sections of a thin film magnetic head for explaining the manufacturing method. FIGS. 10A to 14A are process cross sections each taken along a line perpendicular to the track surface. FIGS. 10B to 14B are process cross sections each taken along a line parallel to the track surface.

Figures 10A, 10B:
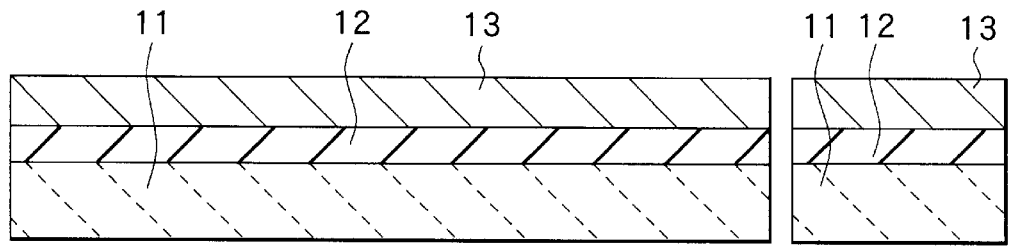
FIGS. 10A and 10B are process cross sections of the thin film magnetic head for explaining a manufacturing method according to the third embodiment of the invention.

(1) First, the substrate 11 made of altic or the like is prepared (refer to FIGS. 10A and 10B) and the insulating layer 12 made of alumina is formed in thickness of about 3 µm to 5 µm on the substrate 11 by, for example, sputtering. A photoresist mask is formed on the insulating layer 12. By using the photoresist mask, NiFe is selectively formed in thickness of about 3 µm by plating. After that, the photoresist mask is removed, thereby forming the bottom shield layer 13 for the reproducing head by using NiFe as shown in FIGS. 10A and 10B. Although not shown in FIGS. 10A and 10B, subsequently, an alumina film having a thickness of about 4 to 6 µm is formed by, for example, sputtering or CVD. The surface of the alumina film is planarized by CMP so as to be flush with the surface of the bottom shield layer 13. As a result, a state such that the alumina film is buried around the bottom shield layer 13 is obtained.

Figures 11A, 11B:
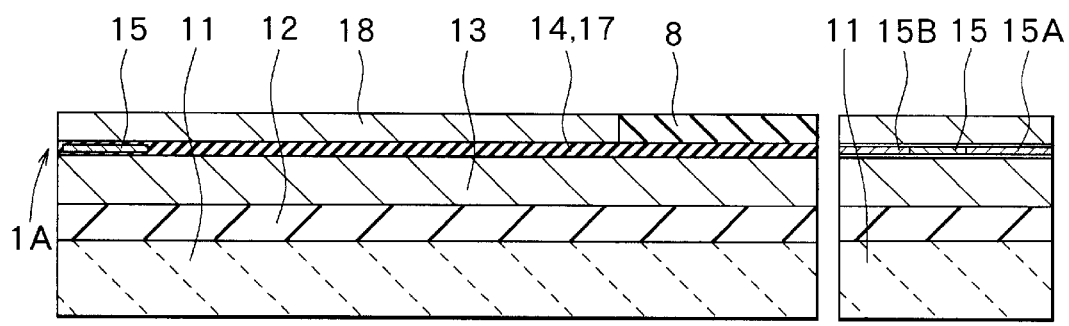
FIGS. 11A and 11B are process cross sections of the thin film magnetic head following FIGS. 10A and 10B, respectively.

(2) For example, an alumina film is deposited in thickness of 100 nm to 200 nm on the bottom shield layer 13 by sputtering, thereby forming the shield gap layer 14 (refer to FIGS. 11A and 11B). Subsequently, the MR film 15 constructing an MR device for reproduction is formed in thickness of tens nm on the shield gap layer 14 and is patterned in a desired shape by high-precision photolithography. The lead terminal layers 15A and 15B are formed on both sides of the MR film 15 by, for example, the lift-off method. Then the shield gap layer 17 is formed on the entire surface of the substrate including the surfaces of the shield gap layer 14, MR film 15 and lead terminal layers 15A and 15B to thereby bury the MR film 15 and the lead terminal layers 15A and 15B between the shield gap layers 14 and 17. As shown in FIGS. 11A and 11B, the bottom pole 18 made of NiFe or the like is selectively formed in thickness of about 1.0 µm to 1.5 µm on the shield gap layer 17. The bottom pole 18 also serves as the top shield layer of the reproducing head portion 1A. By forming the bottom pole 18, the reproducing head portion 1A is substantially completed.

Figures 12A, 12B:
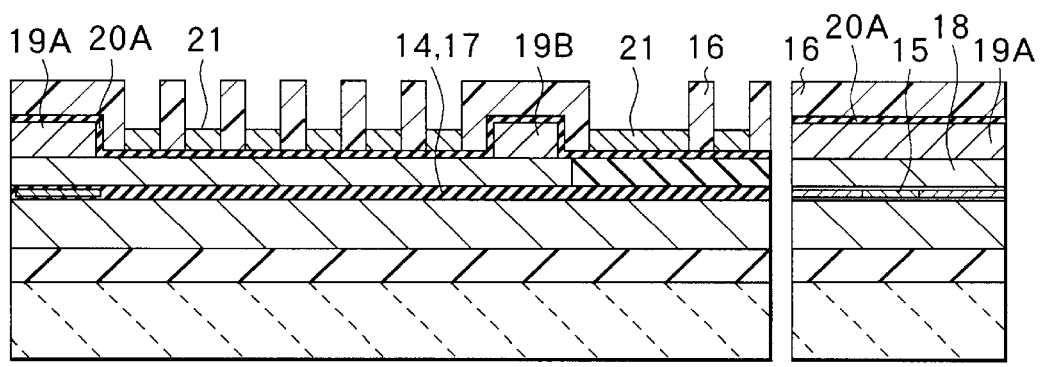
FIGS. 12A and 12B are process cross sections of the thin film magnetic head following FIGS. 11A and 11B, respectively.

(3) The bottom pole tip 19A and the magnetic connection portion 19B are formed in thickness of about 2.0 µm to 2.5 µm on the bottom pole 18 (refer to FIG. 12A). The bottom pole tip 19A and the magnetic connection portion 19B may be formed by a plating film of NiFe or the like in a manner similar to the first embodiment or may be formed by depositing FeN, FeZrNP, CoFeN or the like by sputtering and patterning the resultant film in a predetermined pattern by ion milling or the like.

Subsequently, the insulating layer 20A having a thickness of 0.3 µm to 0.6 µm made of an insulating material such as alumina is formed on the entire surface including the surfaces of the bottom pole tip 19A and the magnetic connection portion 19B by sputtering or CVD. Then the photoresist mask 16 is formed and, as shown in FIGS. 12A and 12B, by using the photoresist mask 16, the first thin film coil 21 for generating a magnetic flux made of Cu or the like is formed by, for example, electrolytic plating on the insulating layer 20A between the bottom pole tip 19A and the magnetic connection portion 19B and on the insulating layer 20A around the magnetic connection portion 19B. The thin film coil 21 is formed in thickness of, for example, 1.0 µm to 2.0 µm at the coil pitch of 1.2 µm to 2.0 µm.

Figures 13A, 13B:
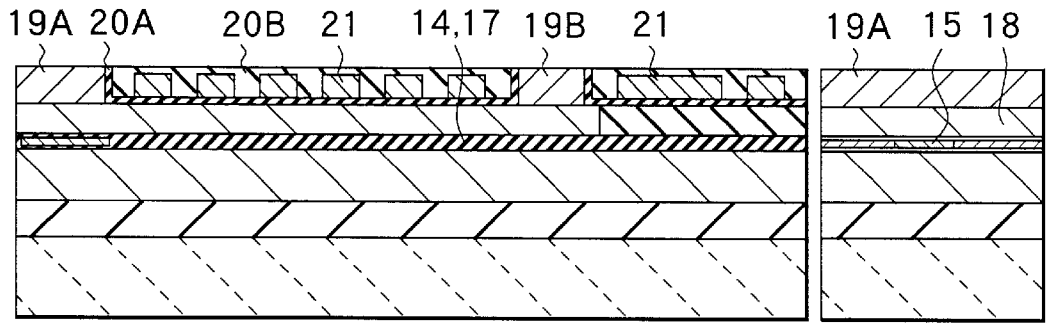
FIGS. 13A and 13B are process cross sections of the thin film magnetic head following FIGS. 12A and 12B, respectively.

(5) After removing the photoresist mask 16, the insulating layer 20B having a thickness of 3.0 µm to 4.0 µm made of an insulating material such as alumina is formed by sputtering on the entire substrate surface including the surface of the thin film coil 21. Subsequently, as shown in FIGS. 13A and 13B, the surface of the insulating layer 20B is planarized by, for example, CMP to a degree that the surface of each of the bottom pole tip 19A and the magnetic connection portion 19B is exposed.

Figures 14A, 14B:
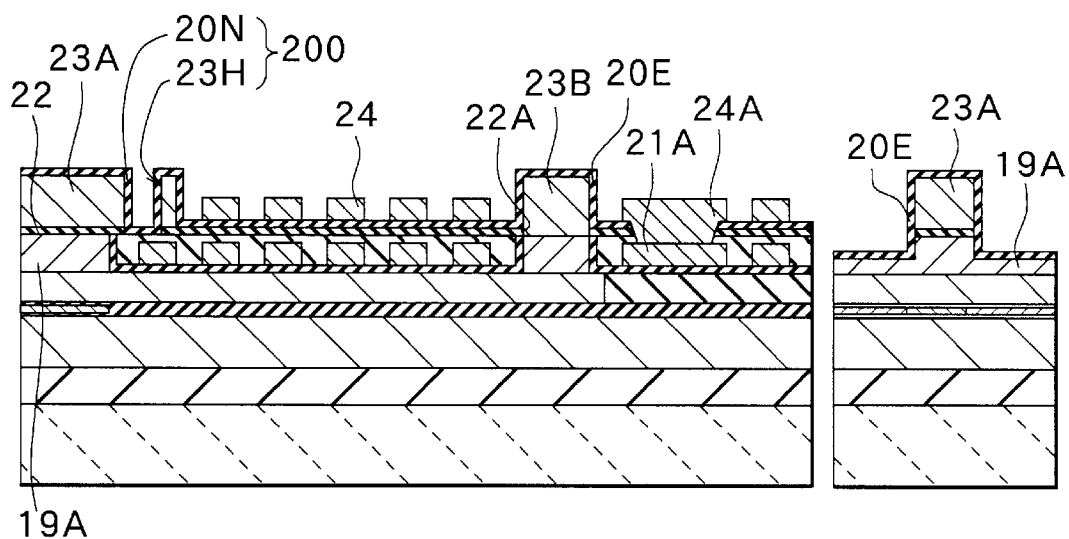
FIGS. 14A and 14B are process cross sections of the thin film magnetic head following FIGS. 13A and 13B, respectively.

(6) On the entire surface of the substrate including the surface of the bottom pole tip 19A, the write gap layer 22 having a thickness of 0.2 µm to 0.3 µm made of an insulating material such as alumina is formed (refer to FIGS. 14A and 14B). For the write gap layer 22, as described in the first embodiment, nonmagnetic materials other than alumina can be practically used. Subsequently, the write gap layer 22 is patterned on the magnetic connection portion 19B to form the opening 22A for magnetically connecting the magnetic connection portion 19B and the magnetic connection portion 23B formed on the magnetic connection portion 19B.

Subsequently, the top pole tip 23A is formed on the write gap layer 22 on the bottom pole tip 19A, and the magnetic connection portion 23B is also formed. Specifically, a pole layer having a thickness of 2.0 μm to 3.0 μm made of a material having high saturated magnetic flux density is formed by, for example, sputtering and is patterned by argon ion milling by using the photoresist mask, thereby enabling the top pole tip 23A and the magnetic connection portion 23B to be formed. Each of the top pole tip 23A and the magnetic connection portion 23B may be formed by plating. Further, in the same process as that of the top pole tip 23A and that of the magnetic connection portion 23B, the through hole 23H in the nonmagnetic area 200 is formed in the top pole tip 23A (near the position where the throat height TH is zero) (refer to FIG. 14A). That is, the through hole 23H can be formed simultaneously with the patterning of the top pole tip 23A and the like. The magnetic connection portion 23B is magnetically coupled to the bottom pole 18 with the magnetic connection portion 19B interposed through the opening 22A. In place of the photoresist mask, an etching mask formed by an inorganic insulating film made of alumina or the like may be used.

Subsequently, by using the top pole tip 23A as an etching mask, a part of the surface of each of the write gap layer 22 and the bottom pole tip 19A which are around the top pole tip 23A is etched in a self aligned manner. The write gap layer 22 is patterned by RIE using chlorine gas. The bottom pole tip 19A is patterned by, for example, argon ion milling and a part of about 0.3 μm to 0.6 μm in the surface of the bottom pole tip 19A is etched. After completion of the process, the recording head portion 1B of the trim structure is completed.

Subsequently, the insulating layer 20E having a thickness of 0.3 μm to 0.6 μm made of, for example, alumina is formed on the entire surface of the substrate including the surfaces of the top pole tip 23A and the magnetic connection portion 23B by sputtering or CVD. By the formation of the insulating layer 20E, a part of the insulating layer 20E is buried as the nonmagnetic body 20N in the through hole 23H. In such a manner, the nonmagnetic area 200 having the through hole 23H and the nonmagnetic body 20N is formed (refer to FIG. 14A). The nonmagnetic body 20N in the nonmagnetic area 200 may include an insulating layer which is formed in the same process as that of the insulating layer 20D to be formed later and is buried in the through hole 23H via the insulating layer 20E.

Subsequently, the insulating layer 20E, write gap layer 22, and insulating layer 20B are selectively etched to expose the surface of the coil connecting portion in the thin film coil 21. As shown in FIG. 14A, the second thin film coil 24 made of Cu or the like is formed in, for example, thickness of 1.0 μm to 2.0 μm at the coil pitch of 1.2 μm to 2.0 μm by electrolytic plating or the like in the recessed area between the top pole tip 23A and the magnetic connection portion 23B on the insulating layer 20E. The second thin film coil 24 is electrically connected to the first thin film coil 21 via the coil connection portion 22C whose surface is exposed.

(7) On the entire surface of the substrate including the surface of the second thin film coil 24, the insulating layer 20D made of alumina or the like is formed in thickness of about 3 μm to 4 μm by sputtering or CVD. The material of the insulating layers 20D and 20E is not limited to alumina but other insulating materials such as silicon dioxide ($SiO_2$) and silicon nitride ($Si_3N_4$) may be also used. Subsequently, the insulating layers 20D and 20E are removed by, for example, CMP so as to expose the surface of each of the top pole tip 23A and the magnetic connection portion 23B, and planarization is performed so that the surfaces of the insulating layers 20E and 20D are flush with the surfaces of the top pole tip 23A and the magnetic connection portion 23B.

Subsequently, for example, by using the same material as that of the top pole tip 23A, the top pole layer 25 is formed in thickness of about 2 μm to 3 μm by, for example, electrolytic plating or sputtering. The top pole 25 is magnetically coupled to the bottom pole 18 via each of the magnetic connection portions 23B and 19B. By forming the top pole 25, the recording head portion 1A is completed.

(8) Finally, as shown in FIGS. 9A and 9B, the overcoat layer 26 having a thickness of about 30 μm made of alumina is formed on the entire surface of the substrate including the surface of the top pole 25 by, for example, sputtering. After that, a slider is machined to form the track surface (air bearing surface) of each of the recording head portion 1A and the reproducing head portion 1B, thereby completing the thin film magnetic head according to the embodiment.

In the embodiment, in a manner similar to the first embodiment, the nonmagnetic area 200 is formed near the top pole tip 23A, that is, near the position where the throat height TH is zero. Consequently, the magnetic flux flowing through the top pole tip 23A and the top pole 25 can be optimally controlled.

Further, in the embodiment, since the nonmagnetic area 200 is formed by creating the through hole 23H upon formation of the top pole tip 23A and burying the nonmagnetic body 20N of the same material in the through hole 23H upon formation of the insulating layers 20E and 20D, the number of manufacturing processes can be reduced.

Figure 15:
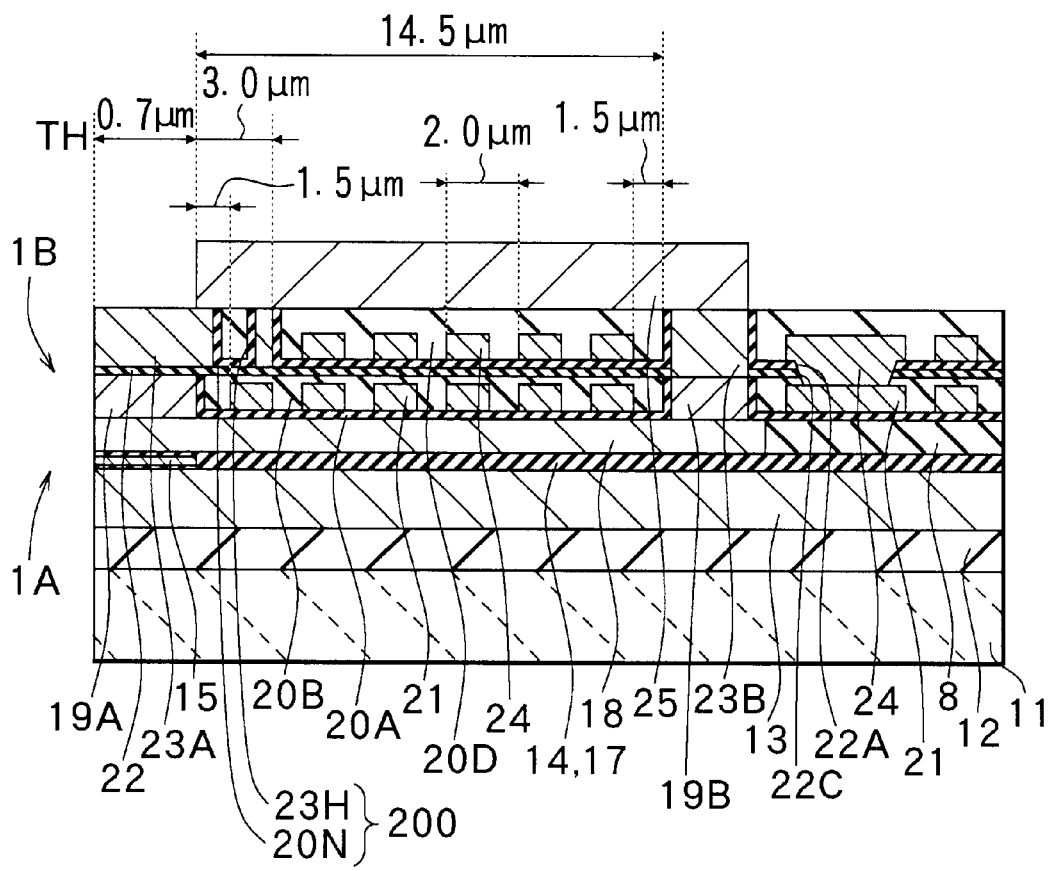
FIG. 15 is a cross section of the main portion of the thin film magnetic head according to the third embodiment of the invention.
Figure 16:
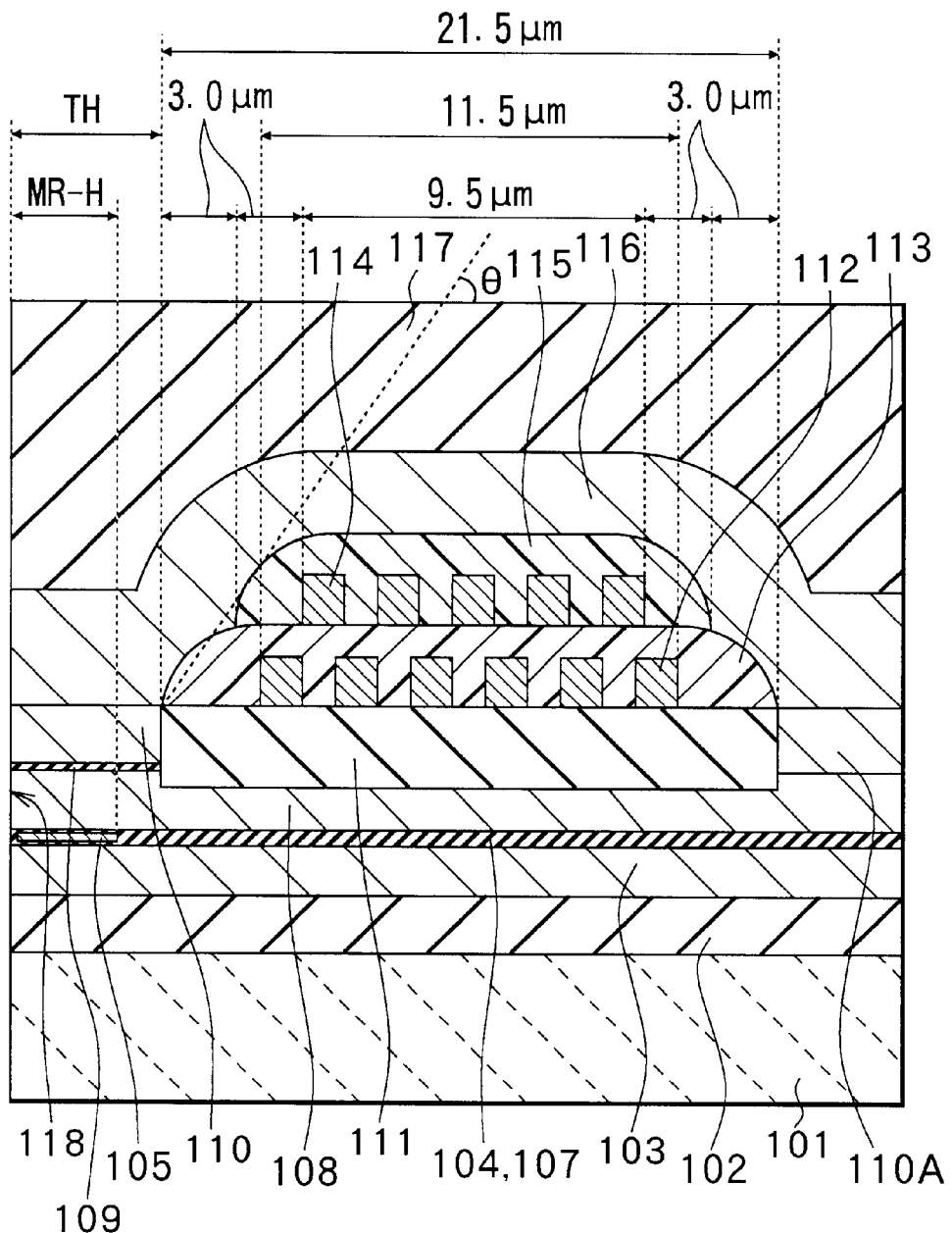
FIG. 16 is a cross section of the main portion of a conventional thin film magnetic head as a comparative example for explaining the effects of the thin film magnetic head according to the third embodiment of the invention.

In the embodiment, an inclined portion in the photoresist pattern as in the conventional technique does not exist and both the first and second thin film coils 21 and 24 are formed on the flat portion, so that the distance between the outer end of the coil on the inclined portion and the position where the throat height TH is zero does not hinder reduction in length of the magnetic path. The length of the magnetic path can be therefore shortened, so that the RF characteristic of the recording head can be remarkably improved. Since the thin film magnetic head according to the embodiment can be designed within a range of 0.1 μm to 0.2 μm of a positioning error of photolithography, the magnetic path length can be reduced to 30 to 40% of the conventional technique. When the number of turns of the thin film coils is the same, the thickness of the coils can be accordingly reduced. FIGS. 15 and 16 show the difference between the magnetic path length of the thin film magnetic head according to the embodiment and that of the conventional thin film magnetic head by indicating design dimensions of an example. FIG. 15 is a cross section of a main portion of the thin film magnetic head according to the embodiment. FIG. 16 is a cross section of a main portion of the conventional thin film magnetic head for comparing the magnetic path length.

Although the nonmagnetic area 200 for controlling the flow of the magnetic flux is formed in a part of the area of the top pole tip 23A in the embodiment, the invention is not limited to this arrangement. For example, the nonmagnetic area 200 can be formed in a part of the area of the top pole 25. In this case, it is preferable to form the nonmagnetic area 200 in a part of the top pole 25 corresponding to the area in which the nonmagnetic area 200 is formed in the embodiment.

Fourth Embodiment

Figures 17A, 17B:
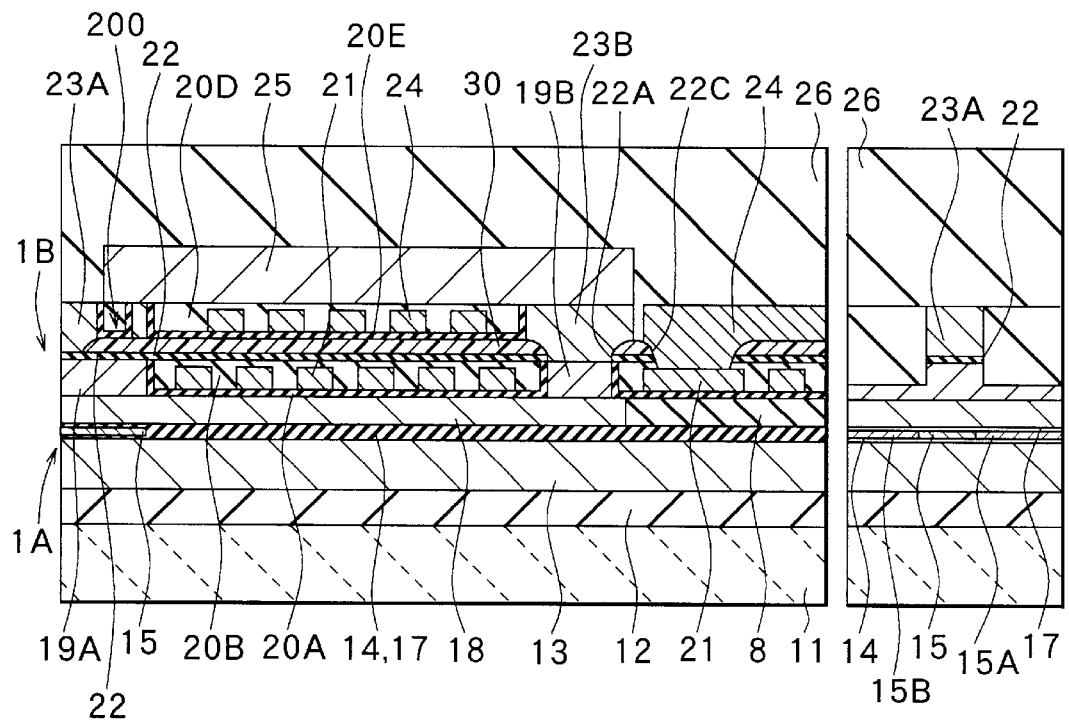
FIG. 17A is a cross section of a main portion of a thin film magnetic head according to a fourth embodiment of the invention, which is taken along a line perpendicular to the track surface.
FIG. 17B is a cross section of the main portion of the thin film magnetic head, which is taken along a line parallel to the track surface.

According to the fourth embodiment of the invention, in the thin film magnetic head according to the third embodiment, a photoresist insulating film which determines the throat height TH is formed between the first and second thin film coils 21 and 24. FIGS. 17A and 17B are cross sections of a main portion of a thin film magnetic head according to the fourth embodiment of the invention, which are taken along a line perpendicular to the track surface and a line parallel to the track surface, respectively.

As shown in FIGS. 17A and 17B, in the embodiment, the recording head portion 1B has: a bottom magnetic layer including the bottom pole 18 and the bottom pole tip 19A which are magnetically coupled to each other; a top magnetic layer including the top pole 25 and the top pole tip 23A which are magnetically coupled to each other; and two thin film coils 21 and 24 for generating a magnetic flux. The bottom pole tip 19A and the top pole tip 23A face each other via the write gap layer 22. The nonmagnetic area 200 for controlling the flow of a magnetic flux is formed in a part of the area of the top pole tip 23A.

The second thin film coil 24 is disposed on the first thin film coil 21 via the write gap layer 22 and a photoresist insulating film 30. By performing a proper heat treatment after the application of the photoresist insulating film 30, the surface of the photoresist insulating film 30 can be planarized. Moreover, the photoresist insulating film 30 can determine the contact position of the write gap layer 22 and the top pole tip 23A to thereby determine the position where the throat height TH is zero.

A method of manufacturing the thin film magnetic head according to the embodiment will now be described. FIGS. 18A and 18B to FIGS. 23A and 23B are process cross sections of a thin film magnetic head for explaining the manufacturing method. FIGS. 18A to 23A are process cross sections each taken along a line perpendicular to the track surface. FIGS. 18B to 23B are process cross sections each taken along a line parallel to the track surface.

Figures 18A, 18B:
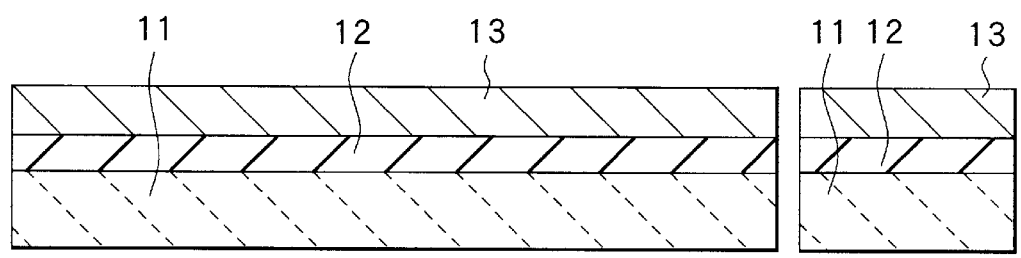
FIGS. 18A and 18B are process cross sections of the thin film magnetic head for explaining a manufacturing method according to the fourth embodiment of the invention.

First, the substrate 11 made of altic or the like is prepared (refer to FIGS. 18A and 18B) and the insulating layer 12 made of alumina is formed in thickness of about 3 $\mu$m to 5 $\mu$m on the substrate 11 by, for example, sputtering. A photoresist mask is formed on the insulating layer 12. By using the photoresist mask, NiFe is selectively deposited in thickness of about 3 $\mu$m by plating. After that, the photoresist mask is removed, thereby forming the bottom shield layer 13 for the reproducing head by using NiFe as shown in FIGS. 18A and 18B. Although not shown in FIGS. 18A and 18B, subsequently, an alumina film having a thickness of about 4 to 6 $\mu$m is formed by, for example, sputtering or CVD. The surface of the alumina film is planarized by CMP so as to be flush with the surface of the bottom shield layer 13. As a result, a state such that the alumina film is buried around the bottom shield layer 13 is obtained.

Figures 19A, 19B:
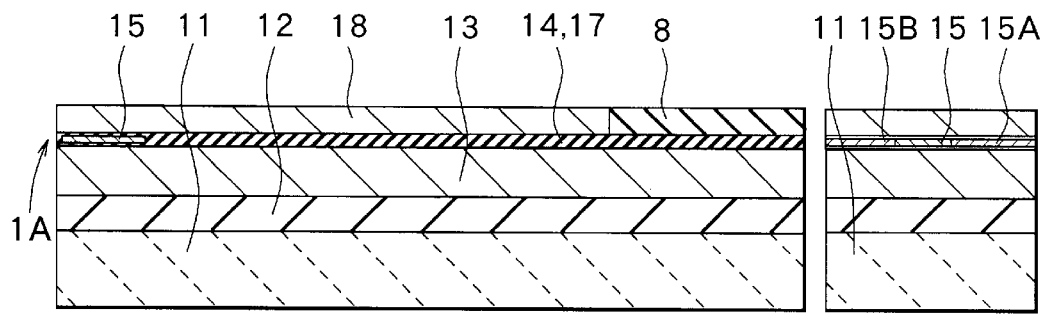
FIGS. 19A and 19B are process cross sections of the thin film magnetic head following FIGS. 18A and 18B, respectively.

For example, an alumina film is deposited in thickness of 100 nm to 200 nm on the bottom shield layer 13 by sputtering, thereby forming the shield gap layer 14 (refer to FIGS. 19A and 19B). Subsequently, the MR film 15 constructing an MR device for reproduction is formed in thickness of tens nm on the shield gap layer 14 and is patterned in a desired shape by high-precision photolithography. The lead terminal layers 15A and 15B are formed on both sides of the MR film 15 by, for example, the lift-off method. Then the shield gap layer 17 is formed on the entire surface of the substrate including the surfaces of the shield gap layer 14, MR film 15 and lead terminal layers 15A and 15B to thereby bury the MR film 15 and the lead terminal layers 15A and 15B between the shield gap layers 14 and 17. As shown in FIGS. 19A and 19B, the bottom pole 18 made of NiFe or the like is formed in thickness of about 1.0 $\mu$m to 1.5 $\mu$m on the shield gap layer 17. The bottom pole 18 also serves as the top shield layer of the reproducing head portion 1A. By forming the bottom pole 18, the reproducing head portion 1A is substantially completed.

Figures 20A, 20B:
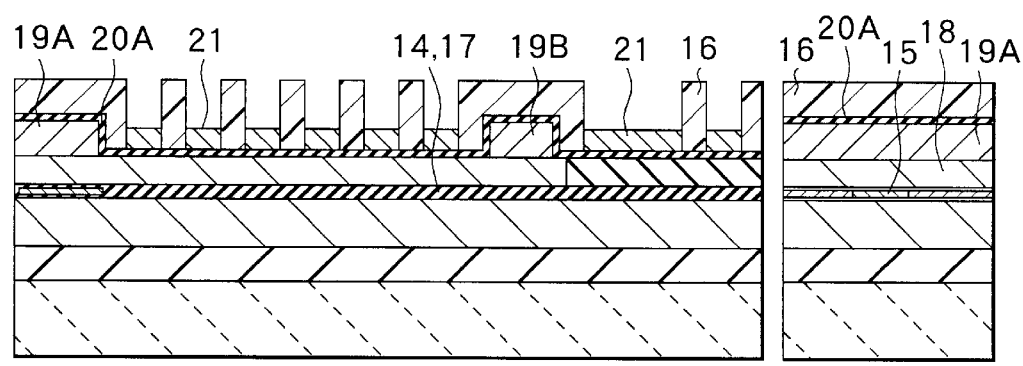
FIGS. 20A and 20B are process cross sections of the thin film magnetic head following FIGS. 19A and 19B, respectively.

The bottom pole tip 19A and the magnetic connection portion 19B are formed in thickness of about 2.0 $\mu$m to 2.5 $\mu$m on the bottom pole 18 (refer to FIG. 20A). The bottom pole tip 19A and the magnetic connection portion 19B may be formed by a plating film of NiFe or the like in a manner similar to the first embodiment or may be formed by depositing FeN, FeZrNP, CoFeN or the like by sputtering and patterning the resultant film in a predetermined pattern by ion milling or the like.

Subsequently, the insulating layer 20A having a thickness of 0.3 $\mu$m to 0.6 $\mu$m made of an insulating material such as alumina is formed on the entire surface of the substrate including the surfaces of the bottom pole tip 19A and the magnetic connection portion 19B by sputtering or CVD. Then the photoresist mask 16 is formed and, as shown in FIGS. 20A, by using the photoresist mask 16, the first thin film coil 21 for generating a magnetic flux made of Cu or the like is formed by, for example, electrolytic plating on the insulating layer 20A between the bottom pole tip 19A and the magnetic connection portion 19B and on the insulating layer 20A around the magnetic connection portion 19B. The thin film coil 21 is formed in thickness of, for example, 1.0 $\mu$m to 2.0 $\mu$m. The pitch of turns of the thin film coil 21 is 1.2 $\mu$m to 2.0 $\mu$m.

Figures 21A, 21B:
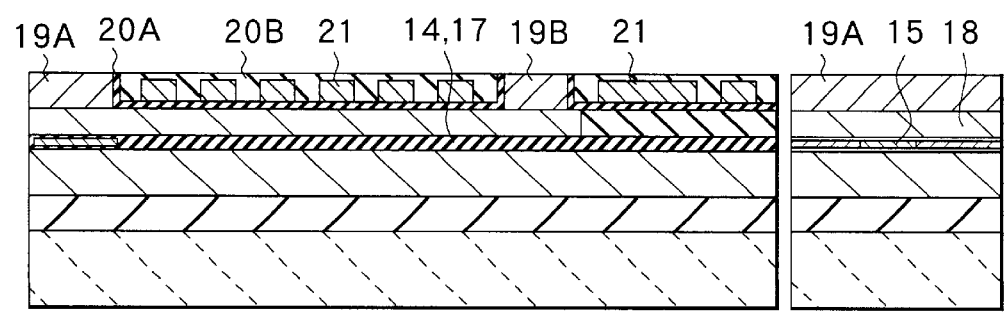
FIGS. 21A and 21B are process cross sections of the thin film magnetic head following FIGS. 20A and 20B, respectively.

(5) After removing the photoresist mask 16, the insulating layer 20B having a thickness of 3.0 $\mu$m to 4.0 $\mu$m made of an insulating material such as alumina is formed by sputtering on the entire substrate surface including the surface of the thin film coil 21. Subsequently, as shown in FIGS. 21A and 21B, the surface of the insulating layer 20B is planarized by, for example, CMP to a degree that the surface of each of the bottom pole tip 19A and the magnetic connection portion 19B is exposed.

Figures 22A, 22B:
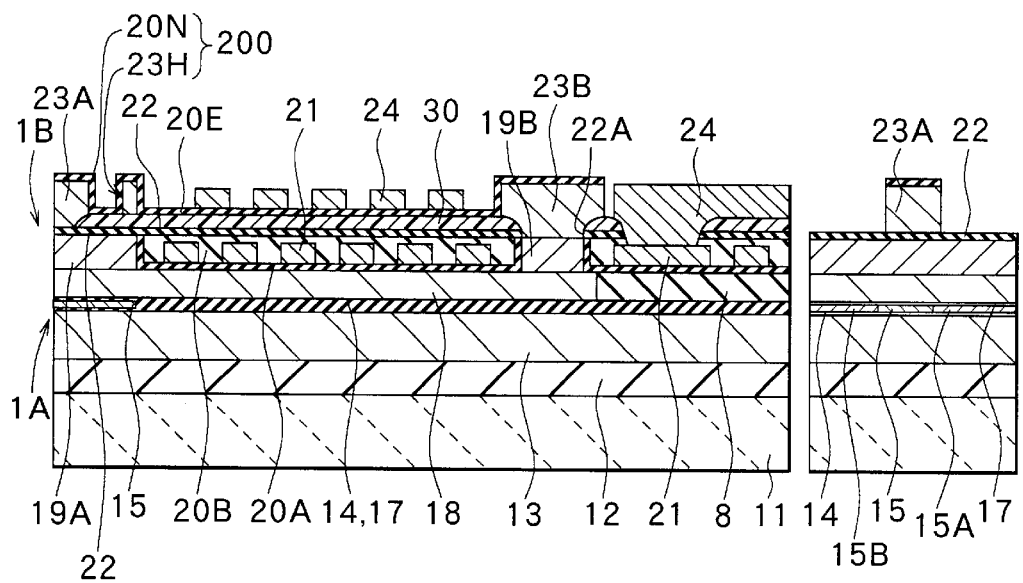
FIGS. 22A and 22B are process cross sections of the thin film magnetic head following FIGS. 21A and 21B, respectively.
Figures 23A, 23B:
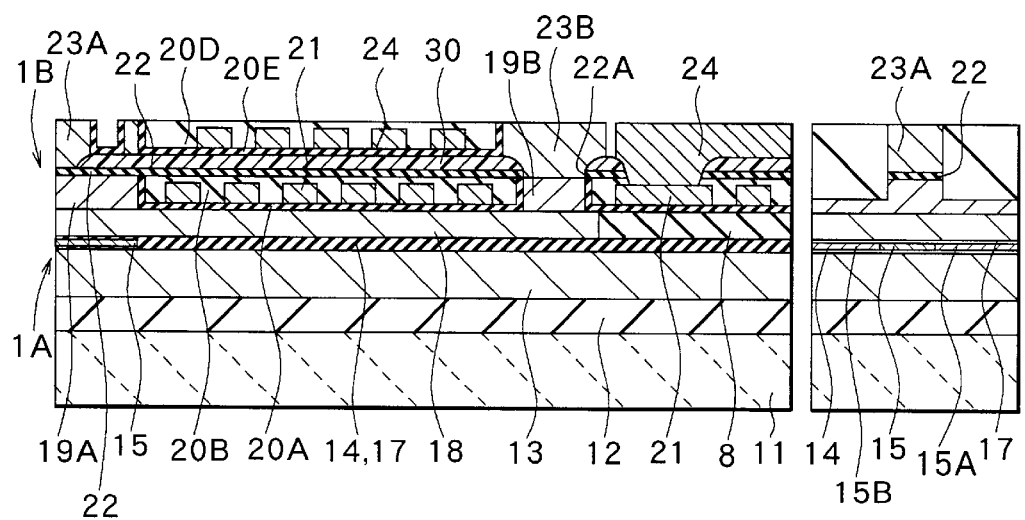
FIGS. 23A and 23B are process cross sections of the thin film magnetic head following FIGS. 22A and 22B, respectively.

(6) On the entire surface of the substrate including the surface of the bottom pole tip 19A, the write gap layer 22 having a thickness of 0.2 $\mu$m to 0.3 $\mu$m made of an insulating material such as alumina is formed by sputtering (refer to FIGS. 22A and 22B). For the write gap layer 22, as described in the first embodiment, nonmagnetic materials other than alumina can be practically used. Subsequently, the write gap layer 22 is patterned on the magnetic connection portion 19B to form the opening 22A for magnetically connecting the magnetic connection portion 19B and the magnetic connection portion 23B formed on the magnetic connection portion 19B, the connection hole 22C for electrically connecting the first thin film coil 21 and the second thin film coil 24 or the coil connection wire, and the like.

Subsequently, the photoresist insulating film 30 is selectively formed on the write gap layer 22 except for the area at least from the track surface to the position where the throat height TH is zero, the area of the opening 22A, and the area of the connection hole 22C. The photoresist insulating film 30 can be formed by being applied in thickness of, for example, 1.0 $\mu$m to 1.5 $\mu$m and exposed and developed in a predetermined shape. A heat treatment is performed as necessary. The photoresist insulating film 30 can position where the throat height TH is zero with high precision.

Subsequently, the top pole tip 23A is formed on the write gap layer 22 on the bottom pole tip 19A, the magnetic connection portion 23B is also formed on the magnetic connection portion 19B through the opening 22A, and the coil connection wire 23C is formed on the first thin film coil 21 through the connection hole 22C. Specifically, a pole layer having a thickness of 2.0 $\mu$m to 3.0 $\mu$m made of a material having high saturated magnetic flux density is formed by, for example, sputtering and is patterned by argon ion milling by using the photoresist mask, thereby enabling the top pole tip 23A, the magnetic connection portion 23B and the coil connection wire 23C to be formed. Each of the top pole tip 23A, magnetic connection portion 23B, and coil connection wire 23C may be formed by plating. Further, in the same process as that of the top pole tip 23A, the through hole 23H in the nonmagnetic area 200 is formed in position where the throat height TH is zero in the top pole tip 23A (refer to FIG. 22A). That is, the through hole 23H can be formed simultaneously with the patterning of the top pole tip 23A and the like. The magnetic connection portion 23B is magnetically coupled to the bottom pole 18 with the magnetic connection portion 19B interposed through the opening 22A. In place of the photoresist mask, an etching mask formed by an inorganic insulating film made of alumina or the like may be used.

Subsequently, by using the top pole tip 23A as an etching mask, a part of the surface of each of the write gap layer 22 and the bottom pole tip 19A which are around the top pole tip 23A is etched in a self aligned manner. The write gap layer 22 is patterned by RIE using chlorine gas. The bottom pole tip 19A is patterned by, for example, argon ion milling and a part of about 0.3 $\mu$m to 0.6 $\mu$m in the surface of the bottom pole tip 19A is etched. After completion of the process, the recording head portion 1B of the trim structure is completed.

Subsequently, the insulating layer 20E having a thickness of about 0.3 $\mu$m to 0.6 $\mu$m made of, for example, alumina is formed on the entire surface of the substrate including the surfaces of the top pole tip 23A and the magnetic connection portion 23B by sputtering or CVD. By the formation of the insulating layer 20E, a part of the insulating layer 20E is buried as the nonmagnetic body 20N in the through hole 23H. In such a manner, the nonmagnetic area 200 having the through hole 23H and the nonmagnetic body 20N is formed (refer to FIG. 22A). The nonmagnetic body 20N in the nonmagnetic area 200 may include an insulating layer which is formed in the same process as that of the insulating layer 20D to be formed later and is buried in the through hole 23H via the insulating layer 20E.

As shown in FIG. 22A, the second thin film coil 24 made of Cu or the like is formed in, for example, thickness of 1.0 $\mu$m to 2.0 $\mu$m. The pitch of turns of the thin film coil 21 is 1.2 $\mu$m to 2.0 $\mu$m by electrolytic plating or the like in the recessed area between the top pole tip 23A and the magnetic connection portion 23B on the insulating layer 20E.

On the entire surface of the substrate including the surface of the second thin film coil 24, the insulating layer 20D made of alumina or the like is formed in thickness of about 3 $\mu$m to 4 $\mu$m by sputtering or CVD. The material of the insulating layers 20D and 20E is not limited to alumina but other insulating materials such as $SiO_2$ and $Si_3N_4$ may be also used. Subsequently, the insulating layers 20D and 20E are removed by, for example, CMP so as to expose the surface of each of the top pole tip 23A and the magnetic connection portion 23B, and planarization is performed so that the surfaces of the insulating layers 20E and 20D are flush with the surfaces of the top pole tip 23A and the magnetic connection portion 23B.

Then, for example, by using the same material as that of the top pole tip 23A, the top pole layer 25 is formed in thickness of about 2 $\mu$m to 3 $\mu$m by, for example, electrolytic plating or sputtering. The top pole 25 is magnetically coupled to the bottom pole 18 via each of the magnetic connection portions 23B and 19B. By forming the top pole 25, the recording head portion 1A is completed.

Finally, as shown in FIGS. 17A and 17B, the overcoat layer 26 having a thickness of about 30 $\mu$m made of alumina is formed on the entire surface of the substrate including the surface of the top pole 25 by, for example, sputtering. After that, a slider is machined to form the track surface (air bearing surface) of each of the recording head portion 1A and the reproducing head portion 1B, thereby completing the thin film magnetic head according to the embodiment.

Figure 24A:
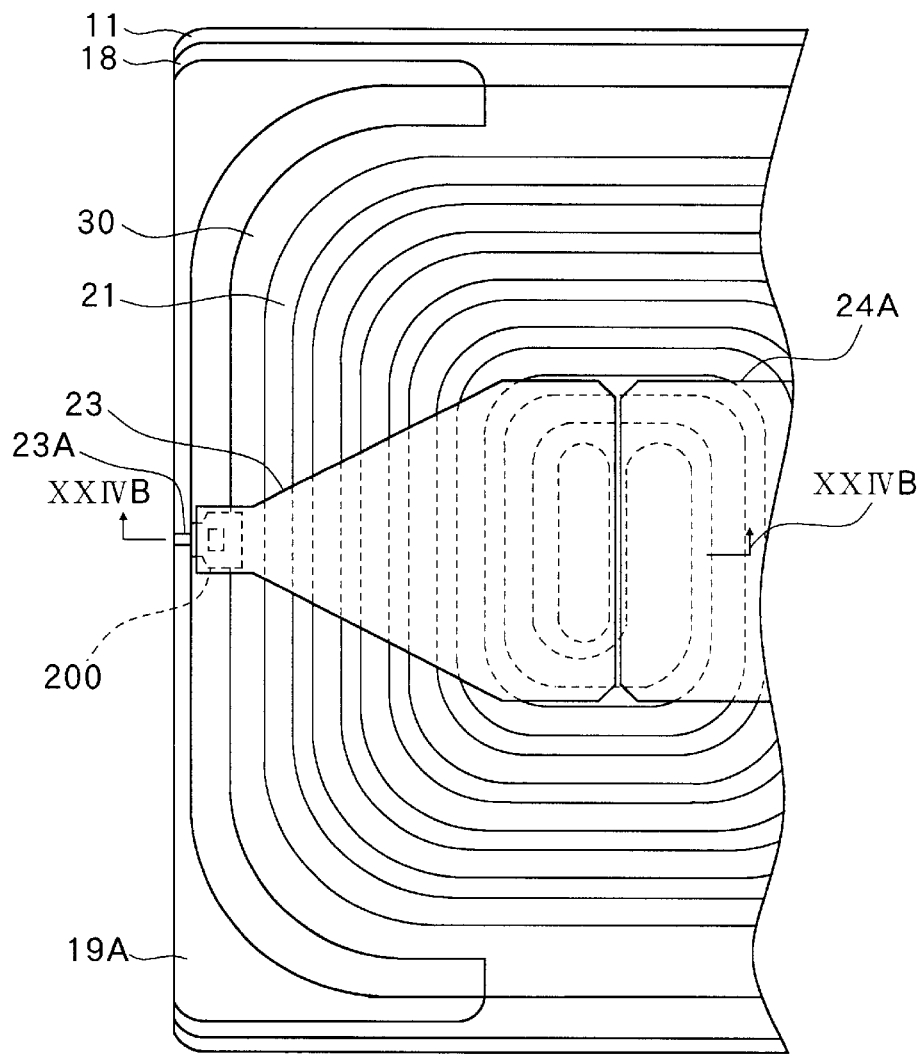
FIG. 24A is a plan view of a thin film magnetic head in design dimensions of an example according to the fourth embodiment of the invention.
Figure 24B:
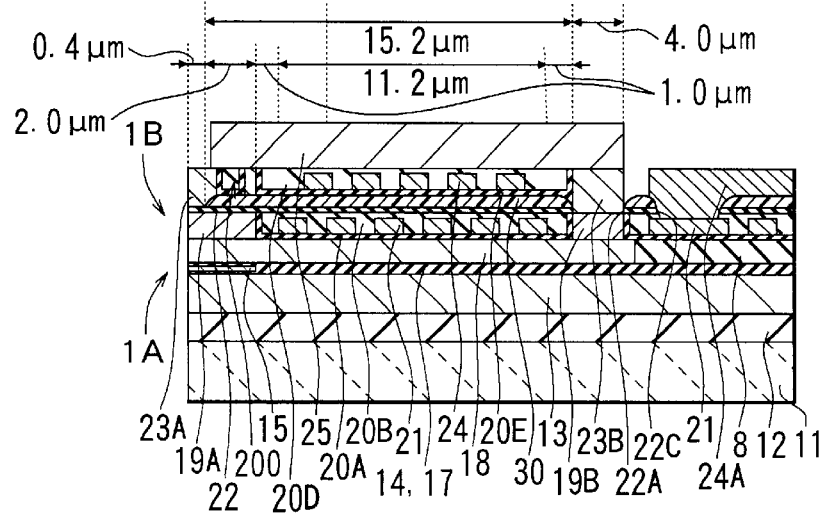
FIG. 24B is a cross section of a main portion of the thin film magnetic head taken along line XXIVA—XXIVA of FIG. 24A.

FIG. 24A is a plan view of a thin film magnetic head according to the embodiment in design dimensions of an example and FIG. 24B is a cross section of a main portion of the thin film magnetic head taken along line XXIVB—XXIVB of FIG. 24A. The thin film magnetic head shown in FIGS. 24A and 24B has the nonmagnetic area 200 in the top pole tip 23A in the recording head portion 1A, near the position where the throat height TH is zero, thereby enabling a difference between the magnetic effective write track width in the high frequency band of 200 MHz to 300 MHz and that in the low frequency band of 20 MHz to 30 MHz to be suppressed as much as possible.

As described above, according to the thin film magnetic head of the embodiment, in a manner similar to the third embodiment, the nonmagnetic area 200 is formed in the top pole tip 23A, that is, near the position where the throat height TH is zero. Consequently, the magnetic flux flowing through the top pole tip 23A and the top pole 25 can be optimally controlled.

Fifth Embodiment

Figure 25A:
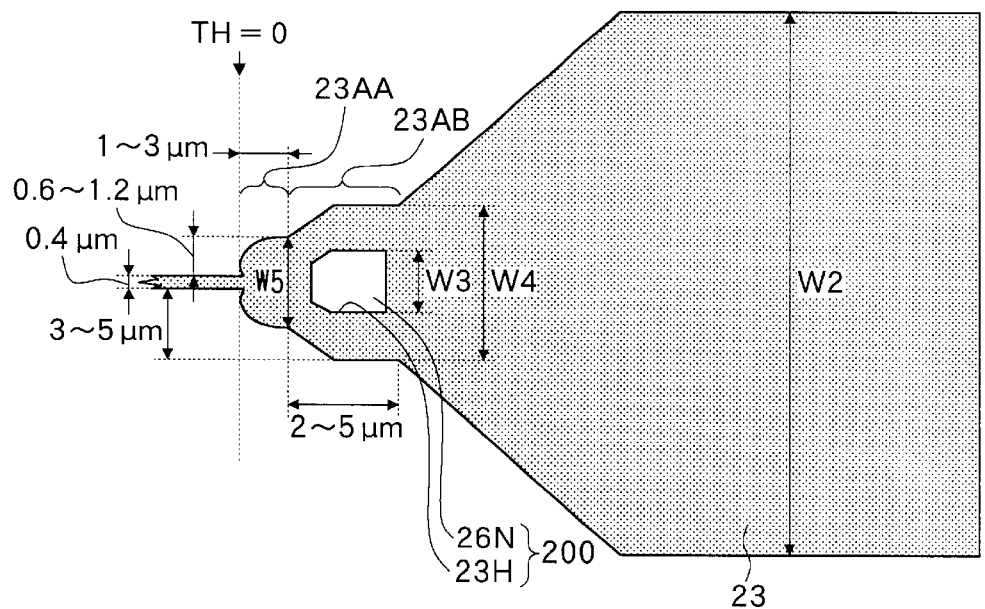
FIG. 25A is a plan view of a top pole in a recording head portion in a thin film magnetic head according to a fifth embodiment of the invention.

A thin film magnetic head according to a fifth embodiment of the invention is similar to that of the second embodiment, in which the top pole tip and the top pole take the form of a single magnetic layer, except for the plane shape of the top pole 23. FIG. 25A is a plan view of the top pole in the recording head portion in the thin film magnetic head according to the fifth embodiment of the invention and FIG. 25B is a plan view of a manufacturing mask of the top pole shown in FIG. 25A.

As shown in FIG. 25A, in the embodiment, the overwrite improvement portions 23AB and 23AA are formed on the top pole 23 in such a manner that the width is gradually narrowed toward the top pole tip 23A. The width W4 of the overwrite improvement portion 23AB is set to be narrower than the width W2 of the top pole 23. The track surface side of the overwrite improvement portion 23AB is chamfered, for example, in the range from 30 to 60 degrees and the width is further narrowed (the magnetic flux is converged). The width W5 of the overwrite improvement portion 23AA is set to be narrower than the width W4 of the overwrite improvement portion 23AB. The track surface side of the overwrite improvement portion 23AA is chamfered at a gentle curvature close to almost an arc, thereby further narrowing the width so as to coincide with the track width.

In the embodiment, the nonmagnetic area 200 is formed in the center portion in the width direction of the overwrite improvement portion 23AB. The plane shape of the nonmagnetic area 200 is similar to that of the overwrite improvement portion 23AB, which is a square shape of which track surface side is chamfered.

Figure 25B:
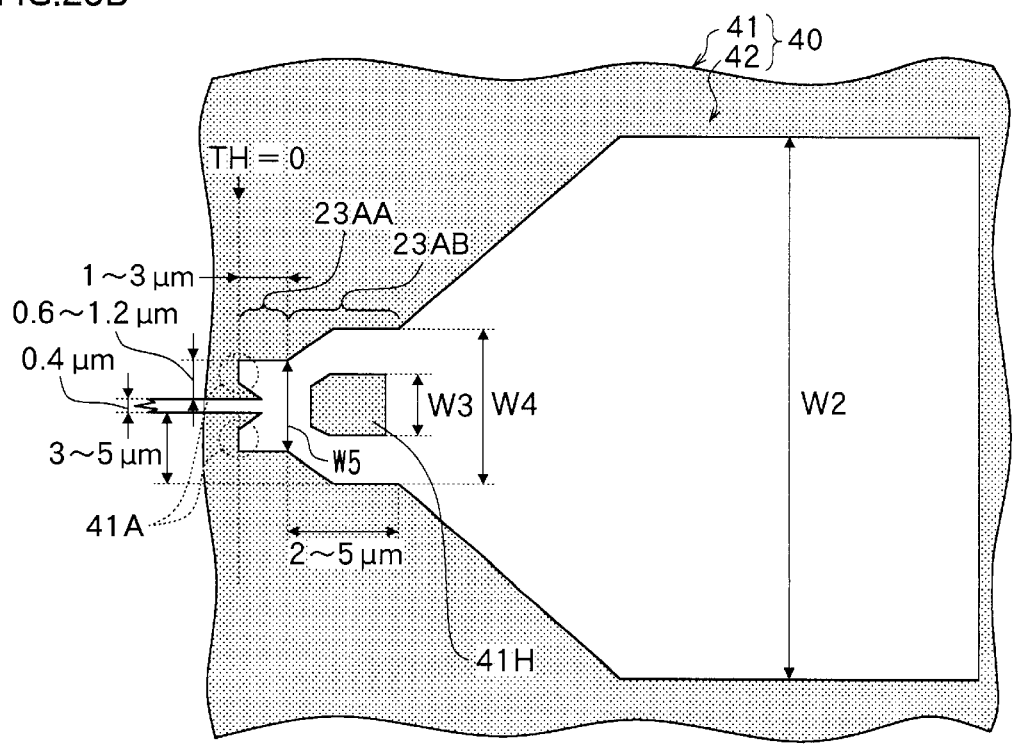
FIG. 25B is a plan view of a manufacturing mask of the top pole shown in FIG. 25A.

Such a top pole 23 can be formed by photolithography using a manufacturing mask (reticle or photo mask) 40 shown in FIG. 25B by photolithography. For example, in the case of using a positive type photoresist film, the manufacturing mask 40 comprises a transparent glass substrate 41 and a shield film 42 made of chrome (Cr) or the like on the transparent glass substrate 41. In the shield film 42, a shade pattern 41A having a wedge-like shape in consideration of a transfer blur of the pattern is formed so that the overwrite improvement portion 23AA is chamfered at a smooth curvature. A shade pattern 41H is a shade pattern for transferring the pattern of the nonmagnetic area 200, more specifically, the through hole 23H.

In the thin film magnetic head and the method of manufacturing the same according to the embodiment, in a manner similar to the second embodiment, the nonmagnetic area 200 is provided in the top pole 23 near the top pole tip 23A. Consequently, the magnetic flux flowing to the top pole tip 23A and the top pole 23 can be optimally controlled. Further, in the embodiment, since the overwrite improvement portions 23AB and 23AA whose widths are narrowed in stages are formed in the top pole 23, the magnetic flux flowing from the top pole 23 to the top pole tip 23A can be gradually converged, so that it makes the magnetic flux flow smoothly. Particularly, since the track surface side of each of the overwrite improvement portions 23AB and 23AA is chamfered, the magnetic flux flowing from the top pole 23 to the top pole tip 23A can be more naturally converged, so that it makes the magnetic flux flow more smoothly.

Sixth Embodiment

A thin film magnetic head according to a sixth embodiment of the invention is similar to that of the third embodiment (in which the top pole tip and the top pole are formed by different two magnetic layers) except for the plane shape of the top pole tip 23A. Each of FIGS. 26A, 27A and 28A is a plan view of a top pole tip in a recording head portion in a thin film magnetic head according to the sixth embodiment of the invention, each of FIGS. 26B, 27B and 28B is a plan view of a manufacturing mask of the top pole tip, and each of FIGS. 26C, 27C and 28C is a plan view of a photoresist film for forming the top pole tip.

In the top pole tip 23A shown in FIG. 26A, the overwrite improvement portion 23B is formed so as to be gradually narrowed toward the track surface. The overwrite improvement portion 23B has a width W7 narrower than the maximum width W6 of the top pole tip 23A. The overwrite improvement portion 23B expands at almost 90 degrees from the position where the throat height TH is zero and has a square shape in plane. The overwrite improvement portion 23B has a plan shape having generally rounded corners. The top pole tip 23A can be formed by using the manufacturing mask 40 shown in FIG. 26B. By using the manufacturing mask 40, the pattern of the top pole tip 23A is transferred onto a photoresist film 50 as shown in FIG. 26C. The photoresist film 50 to which the pattern is transferred is used as a mask, thereby enabling the top pole tip 23A shown in FIG. 26A to be formed.

Figures 27A, 27B, 27C:
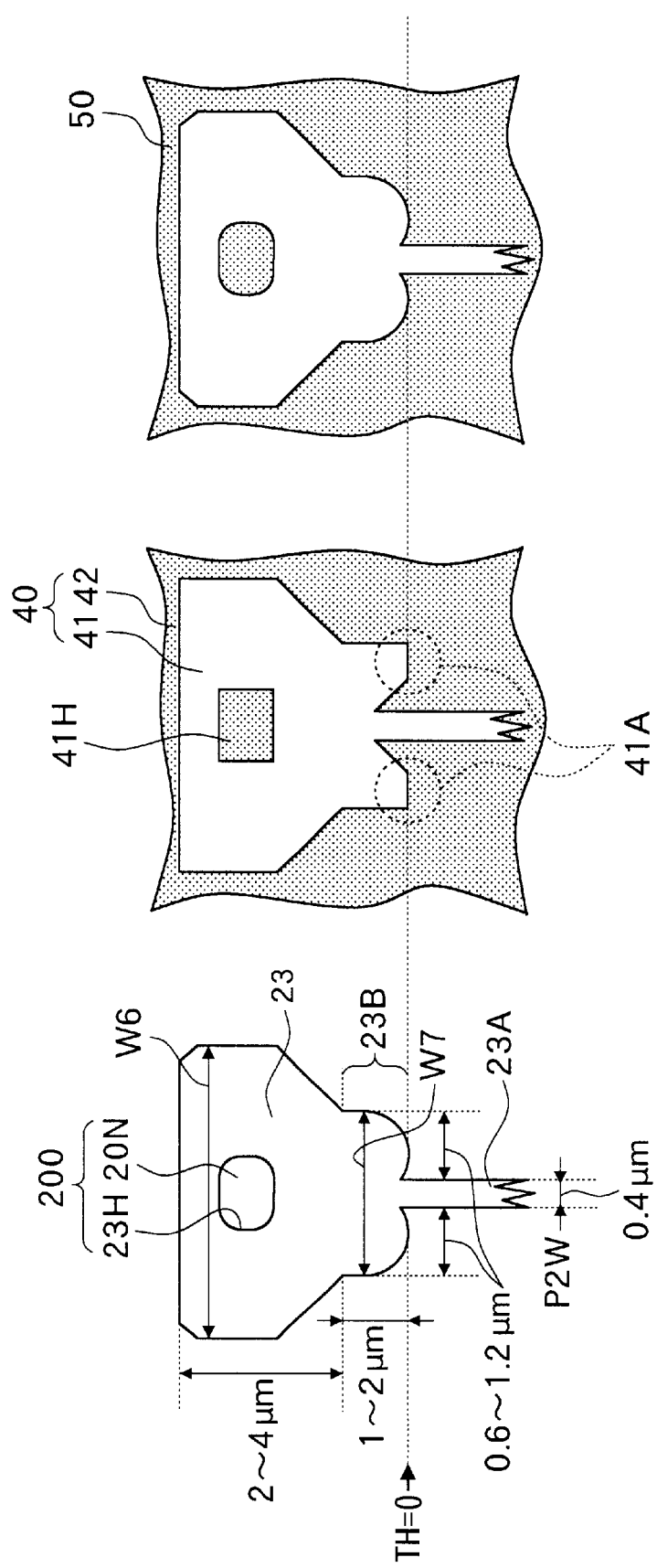
FIG. 27A is a plan view of a top pole tip of another example in a recording head portion in a thin film magnetic head according to the sixth embodiment of the invention.
FIG. 27B is a plan view of a manufacturing mask of the top pole tip.
FIG. 27C is a plan view of a photoresist film for forming the top pole tip.
Figure 28C:
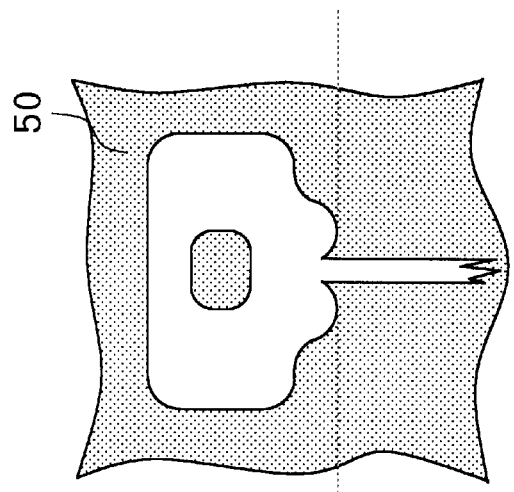
FIG. 28C is a plan view of a photoresist film for forming the top pole tip.
Figure 28B:
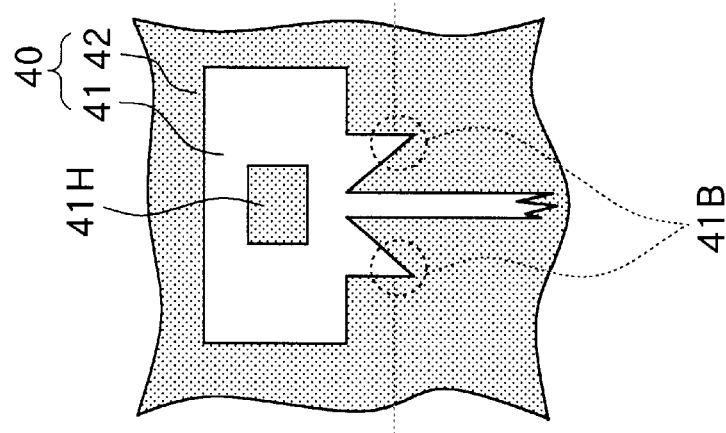
FIG. 28B is a plan view of a manufacturing mask of the top pole tip.

In the top pole tip 23A shown in FIG. 27A, the overwrite improvement portion 23B is formed so as to be gradually narrowed toward the track surface. The track surface side of the overwrite improvement portion 23B is chamfered at a gentle curvature as described in the fifth embodiment. In the manufacturing mask 40 shown in FIG. 27B, in order to realize the chamfer at such a curvature, the shade pattern 41A having a wedge-like shape is formed. The pattern of the top pole tip 23A is transferred onto the photoresist film 50 by using the manufacturing mask 40 as shown in FIG. 27C and the photoresist film 50 on which the pattern is transferred is used as a mask, thereby enabling the top pole tip 23A shown in FIG. 27A to be formed.

Figure 28A:
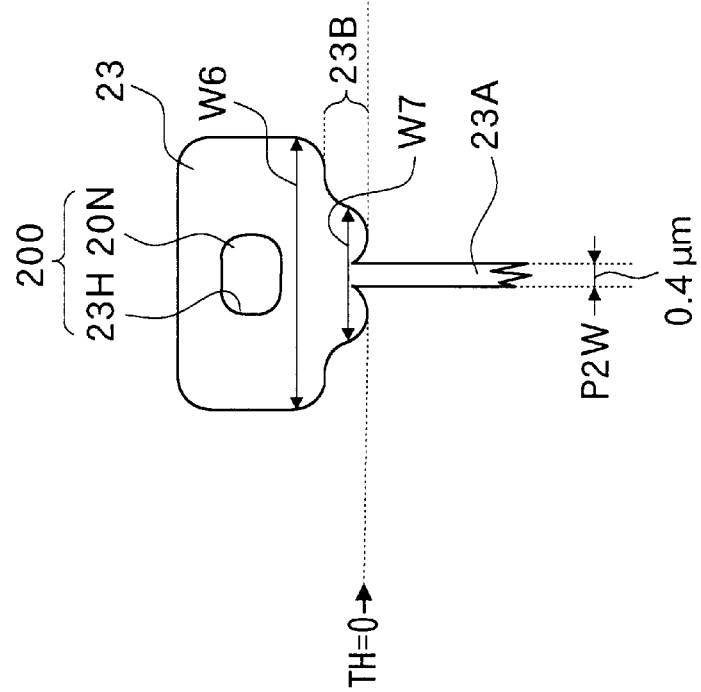
FIG. 28A is a plan view of a top pole tip of further another example in a recording head portion in a thin film magnetic head according to the sixth embodiment of the invention.

In the top pole tip 23A shown in FIG. 28A, the overwrite improvement portion 23B is formed so as to be gradually narrowed toward the track surface. The track surface side of the overwrite improvement portion 23B is chamfered at a curvature smaller than that shown in FIG. 27A. In the manufacturing mask 40 shown in FIG. 28B, in order to realize the chamfer at such a curvature, a shade pattern 41B in a shape like a wedge having an acute-angled end is formed. The pattern of the top pole tip 23A is transferred onto the photoresist film 50 by using the manufacturing mask 40 as shown in FIG. 28C and the photoresist film 50 on which the pattern is transferred is used as a mask, thereby enabling the top pole tip 23A shown in FIG. 28A to be formed.

In the embodiment, in a manner similar to the third embodiment, the nonmagnetic area 200 is provided in the top pole 23 near the top pole tip 23A. Consequently, the magnetic flux flowing to the top pole tip 23A and the top pole 23 can be optimally controlled. Further, in the embodiment, since the overwrite improvement portion 23B is formed in the top pole tip 23A, a sufficient magnetic volume can be assured in the portion and the magnetic saturation in the portion where the magnetic flux flows into the magnetic pole tip 23A can be avoided. Especially, since the track surface side of the overwrite improvement portion 23B shown in each of FIGS. 27A and 28A is chamfered, the magnetic flux flowing to the top pole tip 23A can be converged more smoothly.

Seventh Embodiment

Figure 29A:
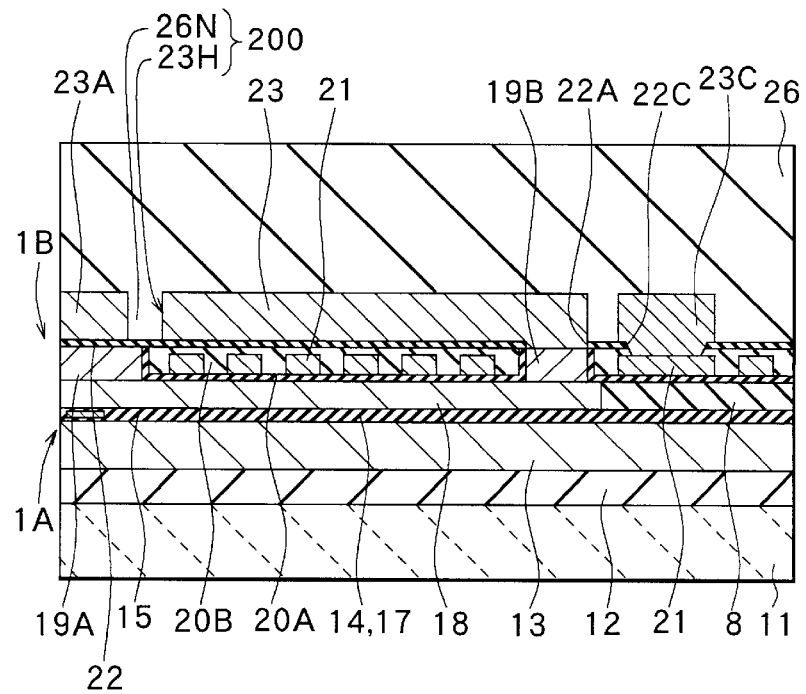
FIG. 29A is a cross section of a main portion of a thin film magnetic head according to a seventh embodiment of the invention.

A thin film magnetic head according to a seventh embodiment of the invention is similar to that of the second embodiment (in which the top pole tip and the top pole are formed by the same magnetic layer) except for the plane shape of the top pole 23. FIG. 29A is a cross section of a main portion of a thin film magnetic head according to the seventh embodiment of the invention and FIG. 29B is a plan view of the recording head portion in the thin film magnetic head shown in FIG. 29A.

Figure 29B:
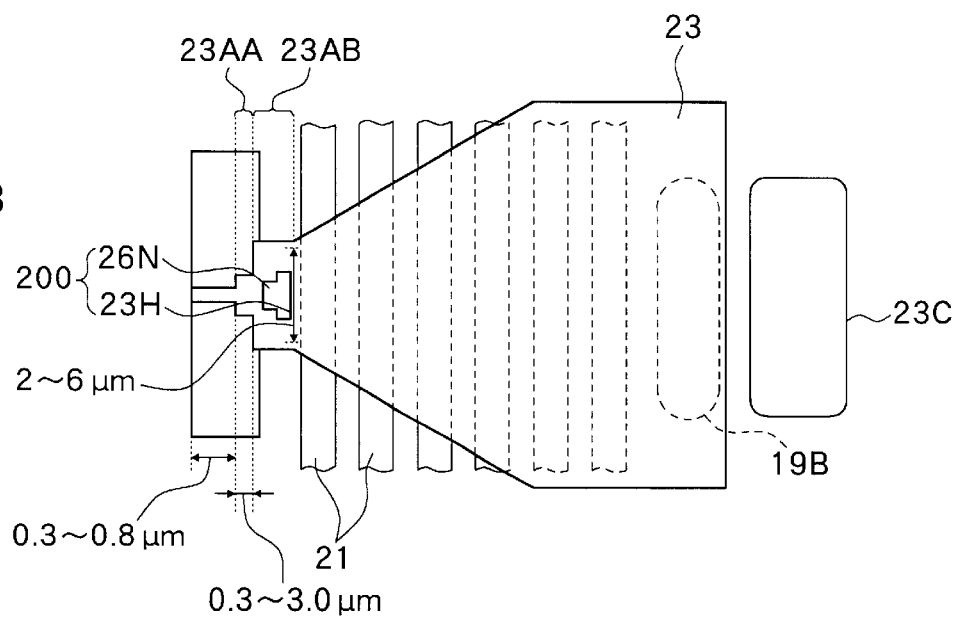
FIG. 29B is a plan view of a recording head portion in the thin film magnetic head shown in FIG. 29A.
Figures 35A, 35B:
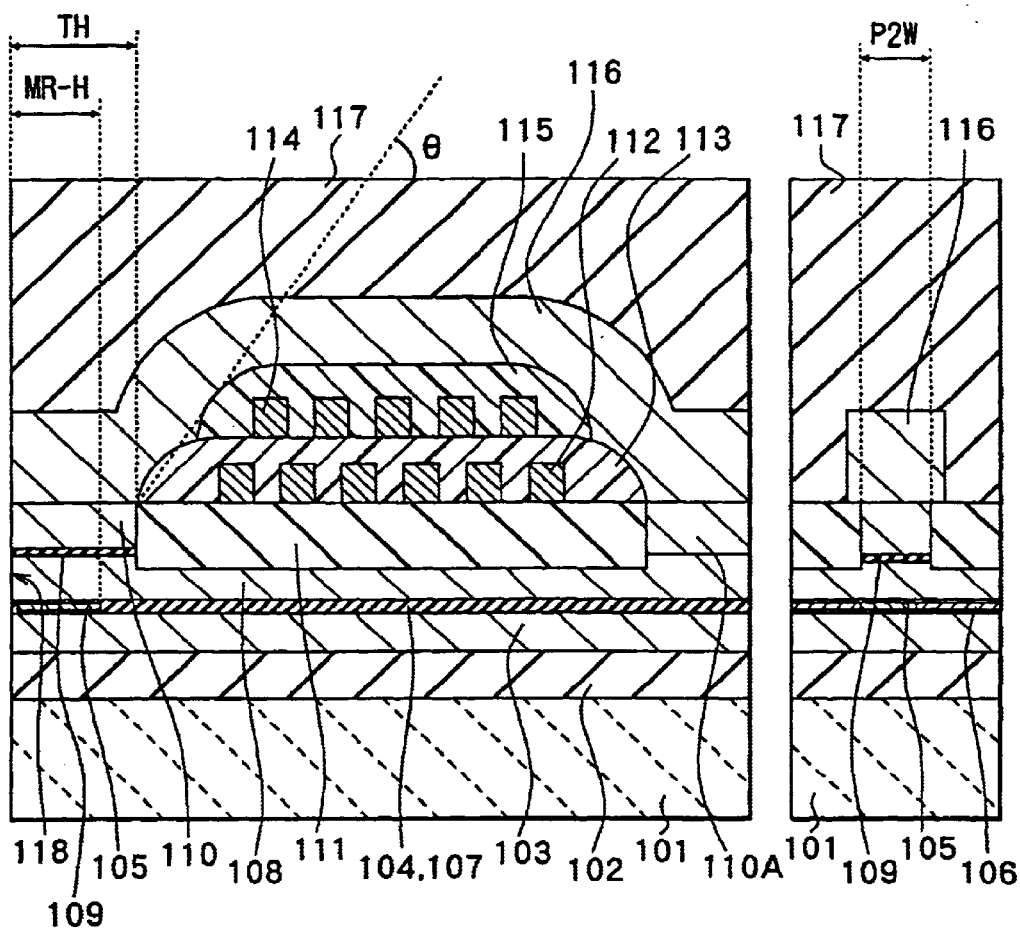
FIGS. 35A and 35B are process cross sections following FIGS. 34A and 34B, respectively.
Figure 36:
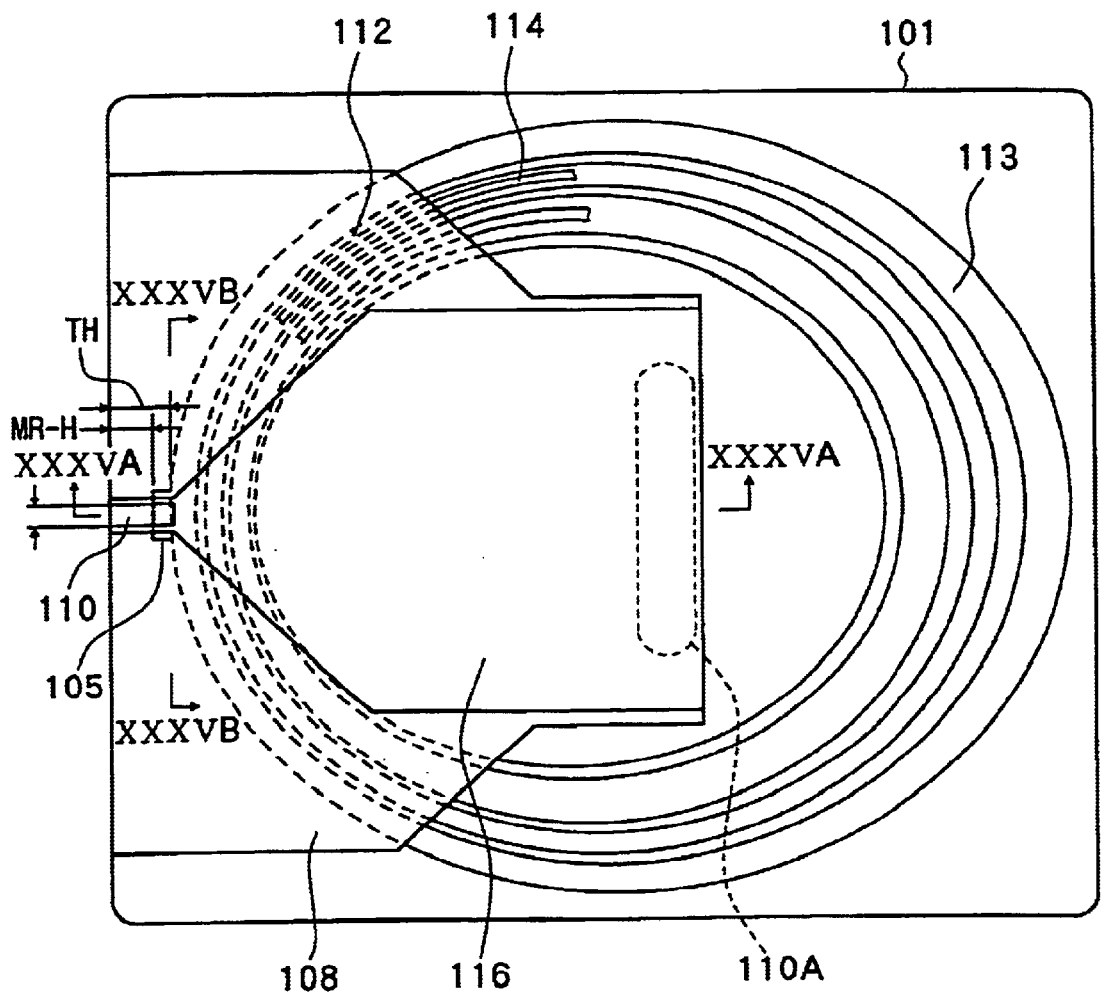
FIG. 36 is a plan view of a conventional composite thin film magnetic head.

As shown in FIGS. 29A and 29B, in the embodiment, the overwrite improvement portions 23AB and 23AA are formed so as to be gradually narrowed toward the top pole tip 23A. The plan shape of a part consisting of the overwrite improvement portions 23AB and 23AA is a T-shape.

The nonmagnetic area 200 is formed in the center in the width direction of the overwrite improvement portion 23AB and the plan shape of the nonmagnetic area 200 is similar to the convex shape of the combination of the overwrite improvement portions 23AB and 23AA.

In the embodiment, in a manner similar to the third embodiment, the nonmagnetic area 200 is formed in the top pole 23 close to the top pole tip 23A. Consequently, the magnetic flux flowing to the top pole tip 23A and the top pole 23 can be optimally controlled.

Although the invention has been described above by the plurality of embodiments, the invention is not limited to the embodiments but can be variously modified. For example, the case of using the material having a high saturated magnetic flux density such as NiFe, FeN, and FeCoZr for the top pole tip 23A, the top pole layer 25 and the like has been described in the embodiments, each of the components is not always limited to a single layer but can have a structure in which two or more kinds of materials each having a high saturated magnetic flux density are stacked.

The case of forming the insulating layer made of alumina or the like by sputtering or CVD has been described in the embodiments. The invention is not limited to the case but a spin on glass film having a very flat surface can be also used.

Although the nonmagnetic area is formed in a part of either the top pole 23 or the top pole tip 23A in the embodiments, it may be formed in a part of the bottom pole 18 or the bottom pole tip 19A.

In the foregoing embodiments, the composite thin film magnetic head having the reproducing head portion and the recording head portion has been described. The invention can be also applied to a thin film magnetic head having only the recording head portion.

According to the thin film magnetic head of the invention or the method of manufacturing the thin film magnetic head as described above, the nonmagnetic area is formed in a part of the magnetic layer, so that the nonmagnetic area can be allowed to function as a kind of obstacle for the flow of the magnetic flux. Especially, when the nonmagnetic area is disposed close to the pole, the flow of the magnetic flux flowing to the magnetic layer can be effectively controlled.

According to the thin film magnetic head of the invention or the method of manufacturing the thin film magnetic head, the flow of the magnetic flux is shunted almost equally to both sides of the nonmagnetic area, thereby enabling a rush of the magnetic flux from the position near the edge (throat height zero position) on the recording medium facing side of the insulating layer to the recording medium side to be lessened properly. Thus, the side write, spreading of the recording track width, side track erase and the like can be prevented. Further, an amount of variations in the magnetic effective write track width according to different frequency characteristics can be reduced. In the case where the nonmagnetic area for properly controlling the flow of the magnetic flux is formed by a hole and a nonmagnetic body buried in the hole, a high-performance thin film magnetic head can be realized with a simple structure.

Further, according to the method of manufacturing the thin film magnetic head of the invention, when the nonmagnetic area for properly controlling the flow of the magnetic flux is formed in the same process as that of a magnetic layer, the number of manufacturing steps can be reduced.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including:
   a substrate, a top magnetic layer and a bottom magnetic layer magnetically coupled to each other and having respectively a top pole tip and a bottom pole tip which face each other with a gap layer in between in part close to a recording-medium-facing surface facing a recording medium, a thin film coil provided between the top magnetic layer and the bottom magnetic layer, and an insulating layer for insulating the thin film coil from the top magnetic layer and the bottom magnetic layer, the top magnetic layer having a top pole which is magnetically coupled to the top pole tip and is separately formed from the top pole tip so as to extend to an area in which the thin film coil is formed, the top magnetic layer being located away from the substrate and the bottom magnetic layer being located closer to the substrate relative to the top magnetic layer,
   wherein a nonmagnetic area is formed in the top pole tip of the top magnetic layer, the nonmagnetic area including a hole and a nonmagnetic body buried in the hole.

2. A thin film magnetic head according to claim 1, wherein the nonmagnetic area is to control a flow of a magnetic flux in the top pole tip in which the nonmagnetic area is formed.

3. A thin film magnetic head according to claim 1, wherein the nonmagnetic area is made of a material including an insulating material or a conductive material.

4. A thin film magnetic head according to claim 1, wherein an edge position opposite to the recording-medium-facing surface of the bottom pole tip, coincides with an edge position close to the recording-medium-facing surface, of the insulating layer.

5. A thin film magnetic head according to claim 1, wherein the hole is formed to pierce through the top pole tip.

6. A method of manufacturing a thin film magnetic head including:
   a substrate, a top magnetic layer and a bottom magnetic layer magnetically coupled to each other and having respectively a top pole tip and a bottom pole tip which face each other with a gap layer in between in part close to a recording-medium-facing surface facing a recording medium, a thin film coil provided between the top magnetic layer and the bottom magnetic layer, and an insulating layer for insulating the thin film coil from the top magnetic layer and the bottom magnetic layer, the top magnetic layer having a top pole which is separately formed from the top pole tip and is magnetically coupled to the top pole tip so as to extend to an area in which the thin film coil is formed, the top magnetic layer being located away from the substrate and the bottom magnetic layer being located closer to the substrate relative to the top magnetic layer,
   the method comprising the steps of:
   forming the top pole tip;
   forming a hole in the top pole tip; and
   forming a nonmagnetic area that includes the hole and a nonmagnetic body by burying a nonmagnetic body in the hole.

7. A method of manufacturing a thin film magnetic head according to claim 6, wherein the nonmagnetic area is formed so as to control a flow of a magnetic flux in the top pole tip in which the nonmagnetic area is formed.

8. A method of manufacturing a thin film magnetic head according to claim 6, wherein the nonmagnetic area is formed by using a material including an insulating material or a conductive material.

9. A method of manufacturing a thin film magnetic head according to claim 6, wherein the bottom pole tip is formed so that an edge position opposite to the recording-medium-facing surface, of the bottom pole tip coincides with an edge position close to the recording-medium-facing surface, of the insulating layer.

10. A method of manufacturing a thin film magnetic head according to claim 6, wherein the hole is formed to pierce through the top pole tip.

11. A thin film magnetic head including:
    a substrate, a top magnetic layer and a bottom magnetic layer magnetically coupled to each other and having respectively a top pole tip and a bottom pole tip which face each other with a gap layer in between in part close to a recording-medium-facing surface facing a recording medium, a thin film coil provided between the top magnetic layer and the bottom magnetic layer, and an insulating layer for insulating the thin film coil from the top magnetic layer and the bottom magnetic layer, the top magnetic layer having a top pole which is magnetically coupled to the top pole tip, extends to an area in which the thin film coil is formed, and is separately formed from the top pole tip, the top magnetic layer being located away from the substrate and the bottom magnetic layer being located closer to the substrate than the top magnetic layer, wherein a magnetic flux control portion for controlling a flow of a magnetic flux in the top pole tip is provided in the top pole tip of the top magnetic layer.

12. A method of manufacturing a thin film magnetic head including:

a substrate, a top magnetic layer and a bottom magnetic layer magnetically coupled to each other and having respectively a top pole tip and a bottom pole tip which face each other with a gap layer in between in part close to a recording-medium-facing surface facing a recording medium, a thin film coil provided between the top magnetic layer and the bottom magnetic layer, and an insulating layer for insulating the thin film coil from the top magnetic layer and the bottom magnetic layer, the top magnetic layer having a top pole which is magnetically coupled to the top pole tip, extends to an area in which the thin film coil is formed, and is separately formed from the top pole tip, the top magnetic layer being located away from the substrate, and the bottom magnetic layer being located closer to the substrate than the top magnetic layer, the method comprising the steps of:

forming the top pole tip; and forming a magnetic flux control portion for controlling a flow of a magnetic flux in the top pole tip.

* * * * *